Figure 1:
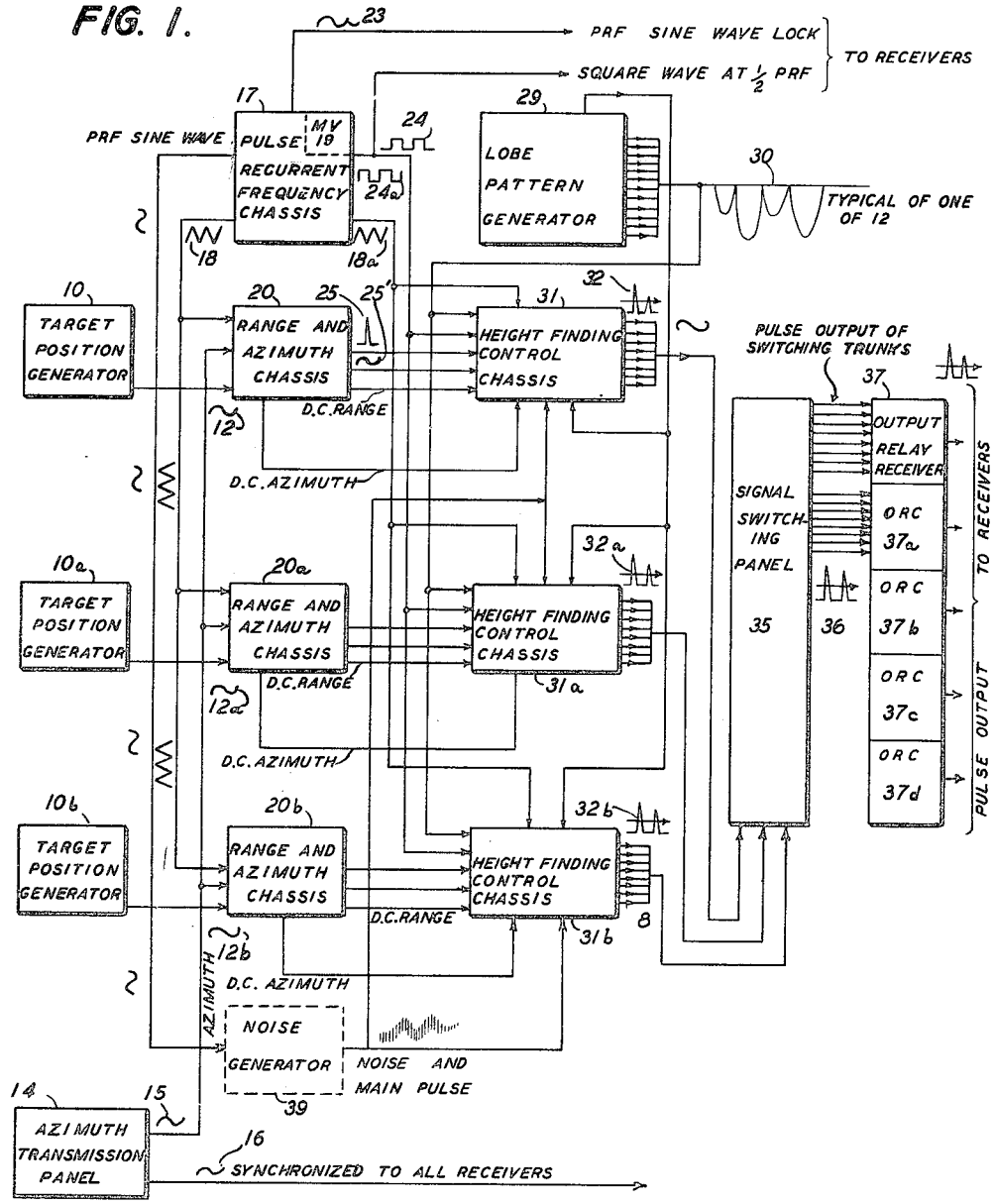

Nov. 9, 1954  R. O. BOLSTER ET AL  2,693,647
RADAR TRAINING SYSTEM
Filed Dec. 21, 1944  12 Sheets-Sheet 1

INVENTOR.
FREDERICK F. FAGAL
ROBERT O. BOLSTER
BY William D. Hall
Attorney

Nov. 9, 1954   R. O. BOLSTER ET AL   2,693,647
RADAR TRAINING SYSTEM
Filed Dec. 21, 1944   12 Sheets—Sheet 2

FIG-2

TARGET POSITION GENERATOR
BLOCK DIAGRAM

INPUT
TWO PHASE SUPPLY VOLTAGE
110V-60 CPS

- 40
- 41
- 42 SINE CAM POTENTIOMETER
- 43 COSINE CAM POTENTIOMETER
- 44
- 45 BEARING OF COURSE
- SPEED CONTROL
- MOTOR
- 40'
- 41'
- 46 "Y" COORDINATE POTENTIOMETER
- 47 "X" COORDINATE POTENTIOMETER
- RESET TO ZERO TRAVEL
- 53
- 57 "Y" STATION PRESET CONTROL
- 58 "X" STATION PRESET CONTROL
- 54
- 51 "Y" COORD. PRESET
- 52 "X" COORD. PRESET
- 55
- 56
- 49 "Y" COORDINATE MEASUREMENT
- 59 AMPLIFIER
- 50 "X" COORDINATE MEASUREMENT

TO ONE RANGE AND AZIMUTH CHASSIS
RANGE AS MAGNITUDE OF AC VOLTAGE   } OUTPUT
AZIMUTH AS PHASE OF AC VOLTAGE

INVENTOR.
FREDERICK F. FAGAL
ROBERT O. BOLSTER
BY
William D. Hall
Attorney

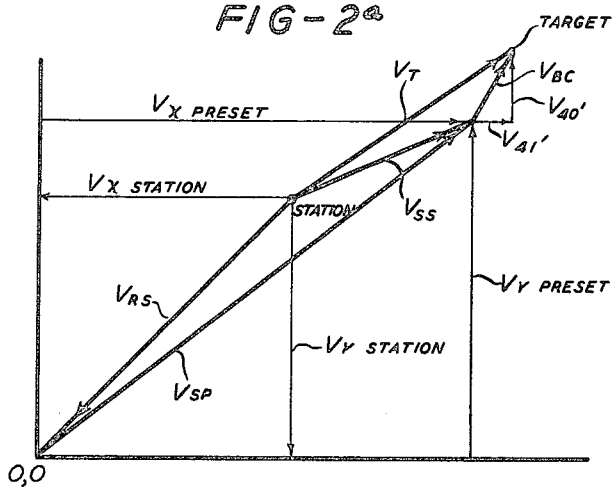
FIG-2ᵃ
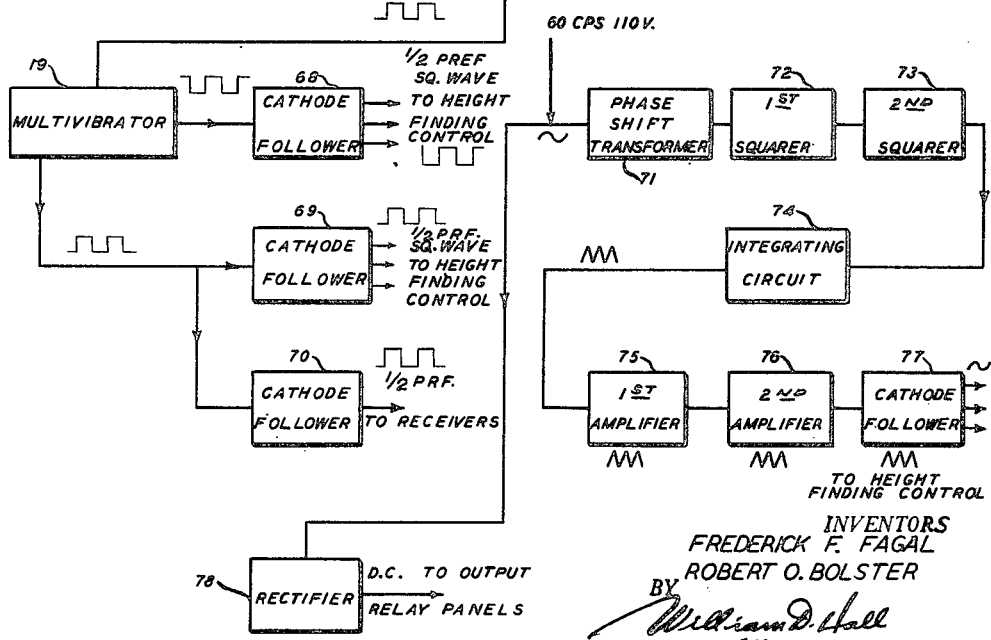
FIG-3

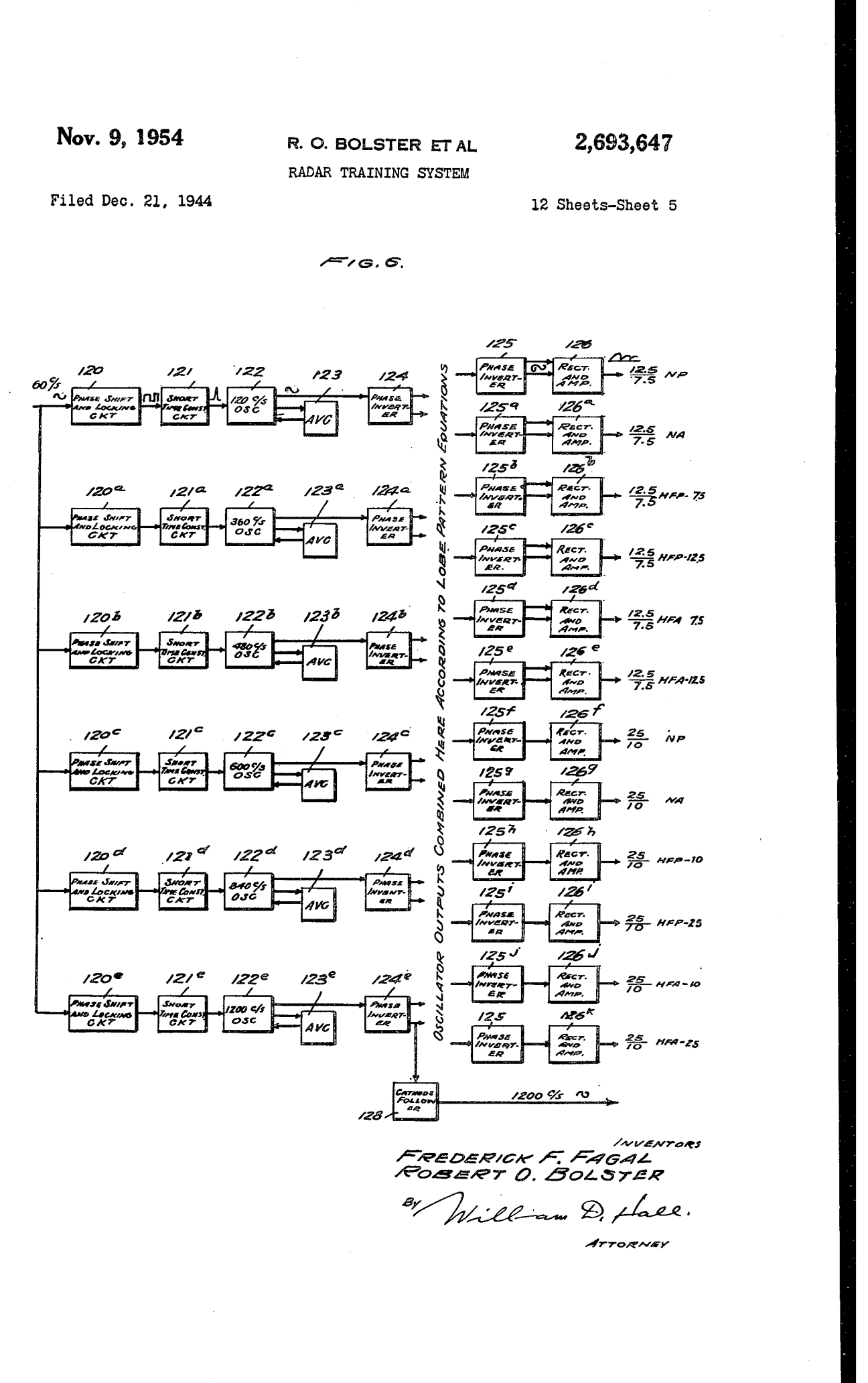

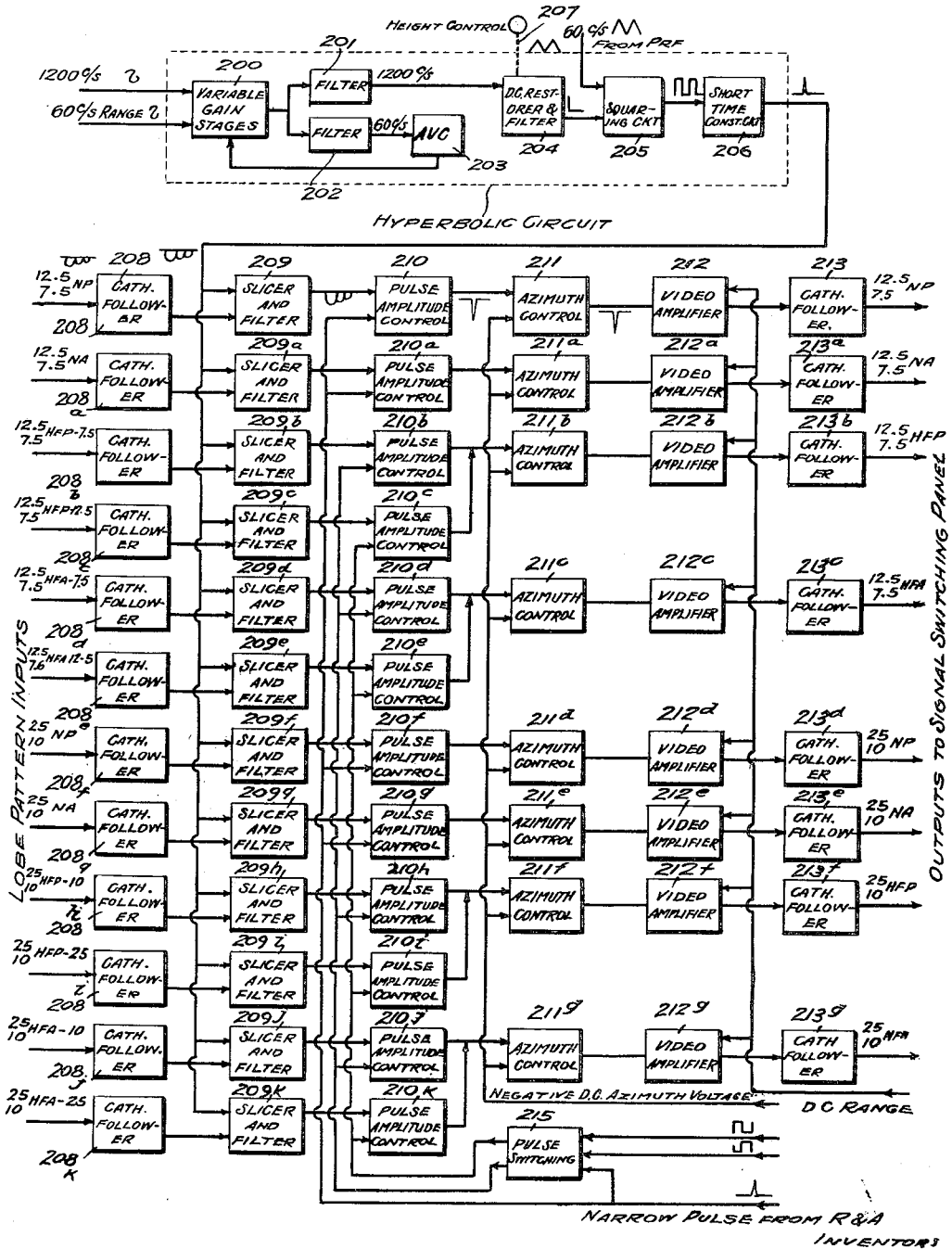

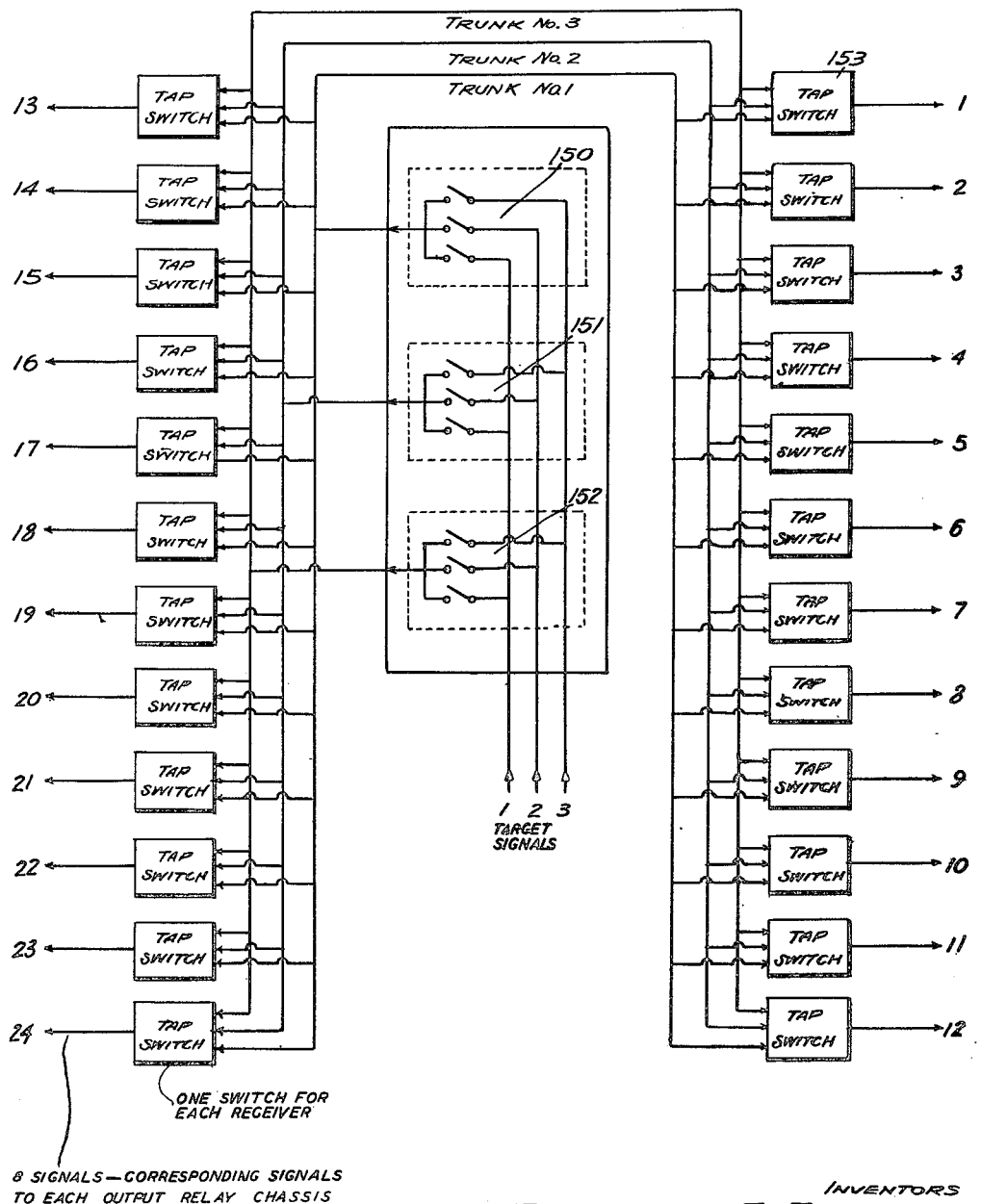

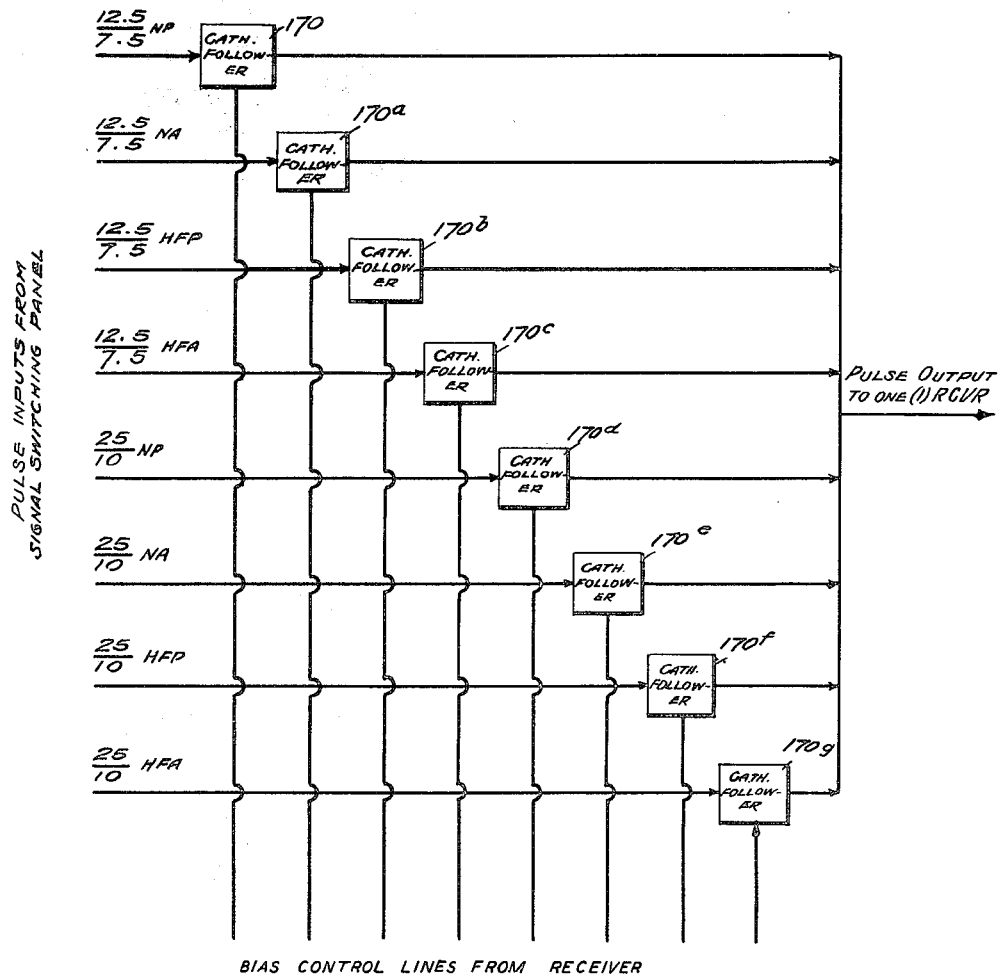

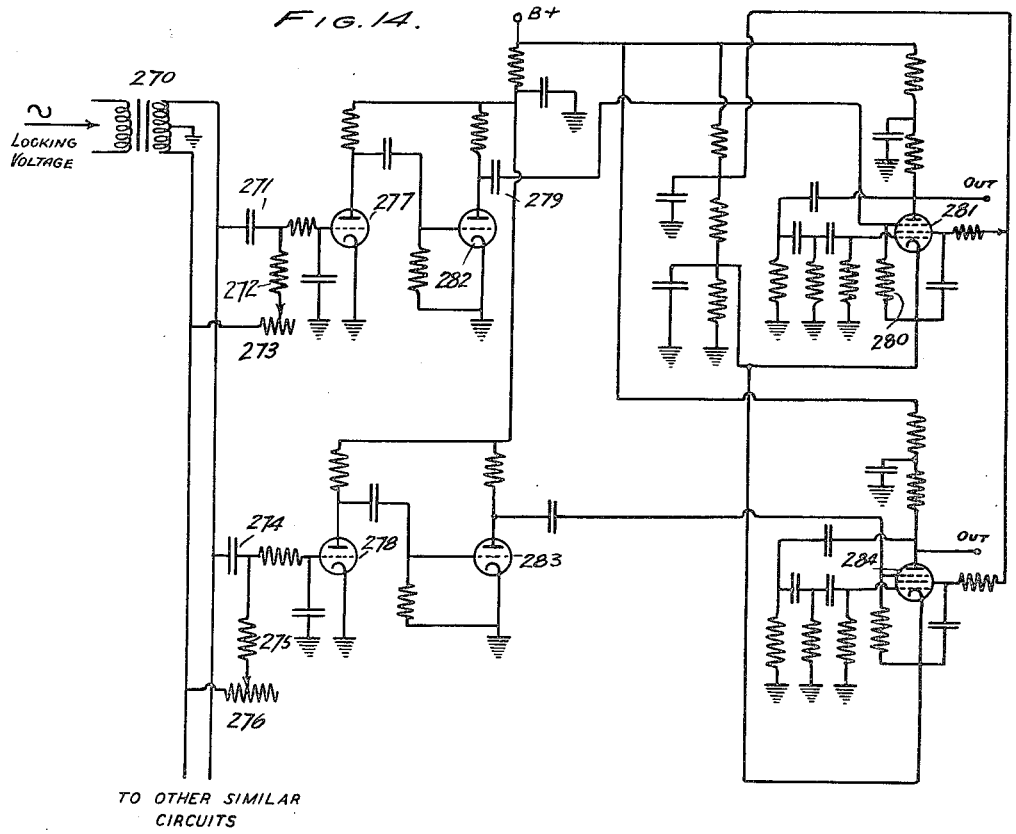
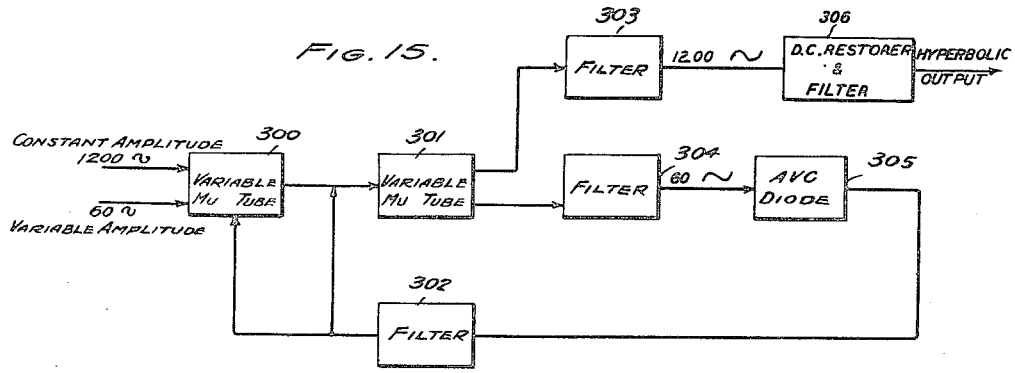

Nov. 9, 1954  R. O. BOLSTER ET AL  2,693,647
RADAR TRAINING SYSTEM
Filed Dec. 21, 1944  12 Sheets-Sheet 12

INVENTOR.
FREDERICK F. FAGAL
ROBERT O. BOLSTER
BY
William D. Hall
Attorney

# United States Patent Office 2,693,647
Patented Nov. 9, 1954

2,693,647

RADAR TRAINING SYSTEM

Robert O. Bolster, Lansing, Mich., and Frederick F. Fagal, Stratford, Conn.

Application December 21, 1944, Serial No. 569,248

23 Claims. (Cl. 35—10.4)

(Granted under Title 35, U. S. Code (1952), sec. 266)

This invention relates to methods and apparatus for training operators of electronic equipment hereinafter referred to as radar, or radio object-locating systems.

It is an object of this invention to provide an apparatus suitable for training operators of radio object-locating apparatus.

It is another object of this invention to provide a method and apparatus that will substantially duplicate in radio object-locating equipment the electrical conditions that would appear in the equipment when an actual moving object or objects are detected by the equipment.

Another object of this invention is to provide a radar training apparatus capable of simultaneous training of many operators.

Still another object of our invention is to provide the necessary electrical circuits required to simulate actual target effects in a radio object-locating system.

The training apparatus and method is hereinafter described as being used with a particular class of radar equipment, but it is understood that the apparatus and principles used therein may be utilized in other radar trainers and other types of electrical and electronic equipment.

Heretofore, radar trainers have been found wanting due to the fact that they did not duplicate conditions found under actual operating conditions. This resulted in operators that were unable to make accurate observations and conclusions from observed data. Our invention overcomes this defect by substantially duplicating electrical conditions existing in a radio object locating system upon detection of a moving target or object.

Radar apparatus generally comprises a transmitter capable of sending out into space a highly directive beam of intermittent high power pulses of radio energy, and a receiver which is capable of receiving reflections of the transmitted pulses caused when an object is located in the beam. The received impulses are then utilized in an indicator such as a cathode ray tube which may indicate range and azimuth of the object. In certain types of radar equipment especially suited for aircraft detection and location, the antenna may be rotated or oscillated about a vertical axis to sweep the entire azimuth or any desired portion thereof. The indicators used in this class of equipment may include a plan position indicator, hereinafter referred to as PPI, which presents a polar coordinate indication in terms of range, and an azimuth bearing of all objects "visible" to the radar system. Also included would be an indicator that discloses in cartesian coordinates the range and echo intensity. This indicator is sometimes called a Height-Range tube.

For the purpose of determining the height of the target it has been found convenient to utilize two antennas at different heights above the ground. With such an antenna array the intensity or signal strength of the reflected pulse or signal received in each antenna from an object some distance away will be different. The ratio of these signal strengths varies with the angle of sight. Therefore, when the two signals are applied to the indicator tube and separated on the time base thereon, there will be seen two pulses of different amplitude, the ratio of these two amplitudes varying with the angle of sight. Therefore, if a chart of ratio of signal strengths of the received signals versus angle of sight is made, the operator may compute the height of the target by means of the formula $H = R \sin \theta$ where $H$=height in feet, $R$=range in feet, and $\theta$=angle of sight in degrees.

However, if only two antennas are used, certain ambiguities will exist and the operator would not have a definite height indication of the target. In addition there would be certain gaps where little or no signal would be received. In order to resolve these ambiguities, and "fill" the gaps two other antennas may be added at different heights above the ground, which will then enable the radar to determine the height of any object "visible" to the radar. One example of antenna heights are 7.5 feet, 10 feet, 12.5 feet, and 25 feet. These antennas are hereinafter referred to as the 7.5 foot array, the 10 foot array, the 12.5 foot array, and the 25 foot array and said arrays may be switched in various combinations. The combinations are selected by the radar operator by means of an antenna selection switch and are as follows:

25/10   Normal phase
25/10   Normal antiphase
25/10   Height-finding phase
25/10   Height-finding antiphase
12.5/7.5   Normal phase
12.5/7.5   Normal antiphase
12.5/7.5   Height-finding antiphase
12.5/7.5   Height-finding phase The term 25/10 normal phase means that transmission is made simultaneously on the 25 foot array and the 10 foot array, the pulses on the two arrays being in phase and reception is had simultaneously on both the 25 foot and the 10 foot array in phase. The term 25/10 normal antiphase means that transmission is made simultaneously on both the 25 foot and 10 foot array but the transmitted signals on one are 180° out of phase with that on the other. On receiving, however, reception is had simultaneously on both the 25 and 10 foot array in phase. The term 25/10 height-finding phase means that transmission is made simultaneously on both the 25 foot array and the 10 foot array in phase, but the signal received on the 25 foot array is first presented on the time base of the height-range tube while the signal from the 10 foot array is switched off. In the next instance the switching reverses and the signal from the 10 foot array is seen on the height-range tube while the signal from the 25 foot array is switched off. This switching occurs at such a rate and on a displaced time base as mentioned above that the operator sees both signals at the same time. The term 25/10 height-finding antiphase means that transmission is made simultaneously on both the 25 foot and 10 foot array but the signals on one are 180° out of phase with the signals on the other. Receiving, however, is exactly the same as that described in the 25/10 height-finding phase. The above descriptions will hold true for the 12.5/7.5 foot arrays where 12.5 foot is substituted for 25 foot and 7.5 foot is substituted for 10 foot. The intensity of a transmitted signal at a point in space will vary depending upon the angle of sight, where angle of sight may be defined as the angle produced between a reflecting plane (the earth) and a line of sight to the particular point in space. Pictorial representation of the variation in signal intensity vs. angle of sight may be called a lobe pattern. The term 25/10 normal phase lobe pattern then refers to a pictorial representation of signal strength vs. angle of sight for an antenna comprising two portions, 25 feet and 10 feet, respectively, above the reflecting plane.

The intensity of a received signal may be similarly defined wherein the received lobe pattern is a representation of the received signal strength vs. angle of sight. For a given antenna the "received" lobe pattern is the same as the "transmitted" lobe pattern. Thus it will be seen that the 25/10 normal phase is the product of 25/10 transmitted phase and 25/10 received which is the same as 25/10 transmitted phase squared.

The 25/10 normal antiphase lobe pattern is the product of the 25/10 transmitted antiphase and 25/10 received phase lobe pattern.

In the height-finding position, we will consider separately what each portion of the antenna does. The 25 foot height-finding phase lobe pattern is the product of the lobe patterns of the 25 foot array and that of the 25/10 transmitted phase. The 10 foot height-finding phase is the product of the lobe pattern of the 10 foot array and that of the 25/10 transmitted phase. The 25 foot height-finding antiphase lobe pattern is the product of lobe patterns of the 25 foot array and 25/10 foot transmitted antiphase combination. The 10 foot height finding antiphase is the product of the lobe pattern of the 10 foot array and the 25/10 transmitted antiphase combination. Similar descriptions hold for the 12.5/7.5 lobe pattern combination where 12.5 foot is substituted for 25 foot and 7.5 foot is substituted for 10 foot.

Therefore, one problem that the radar trainer apparatus must solve is that of duplicating the lobe patterns for each of the combinations of the various antennas. The signals sent by the trainer to the radar receiver must vary in such manner as to substantially duplicate actual signals that are received when the "antennas" are in any of the previously mentioned positions. Since the embodiment of the radar receiver being used as an example herein may receive a total of 12 lobe patterns, it is necessary that the trainer apparatus be able to generate a total of 12 lobe patterns. Four lobe patterns must be duplicated for the 25/10 and 12.5/7.5 normal phase and normal antiphase positions. Eight lobe patterns must also be duplicated, four for the 25/10 and four for the 12.5/7.5 feet arrays, when using the height finding phase and antiphase positions of each array. The four lobe patterns for each array, in the height finding positions, are necessary for the following reasons:

We described previously that when the antenna selection switch is in the 25/10 height finding position, receiving is accomplished alternately on the 25 and 10 foot arrays respectively. In our trainer, it is therefore necessary to produce a lobe pattern that represents the lobe pattern of the 25 foot portion of the 25/10 height-finding phase combination. We also must produce a lobe pattern corresponding to the 10 foot portion of the 25/10 height-finding phase combination. If then we can in effect switch these two lobe patterns alternately, we will be duplicating the function of the 25 foot and 10 foot arrays when in the height-finding position. If then we can modify two signals with these lobe patterns and put these signals on the time base of the height-range tube, and separated thereon, the radar operator will see two signals that will vary in substantially the same manner as those from a target when the antennas are in the 25/10 height-finding phase position.

In a like manner, if we have the lobe patterns corresponding to the 25 foot height-finding antiphase position and the 10 foot height-finding antiphase position, we can switch these in the same manner as just described and have pulses that will vary in the same manner as those reflected or reradiated from a target when the antenna is in the 25/10 height-finding antiphase position. In a like manner, the same functions are performed for the 12.5/7.5 foot arrays. From the above description we therefore find a total of 12 lobe patterns must be generated in order to give complete height-finding information for eight antenna selection switch positions.

Figure 4:
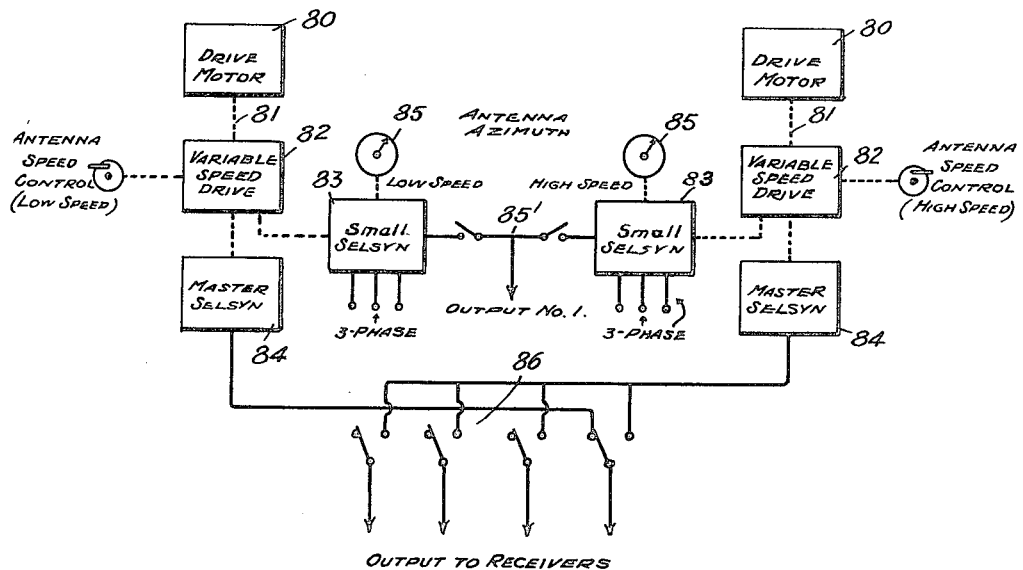
Figure 5:
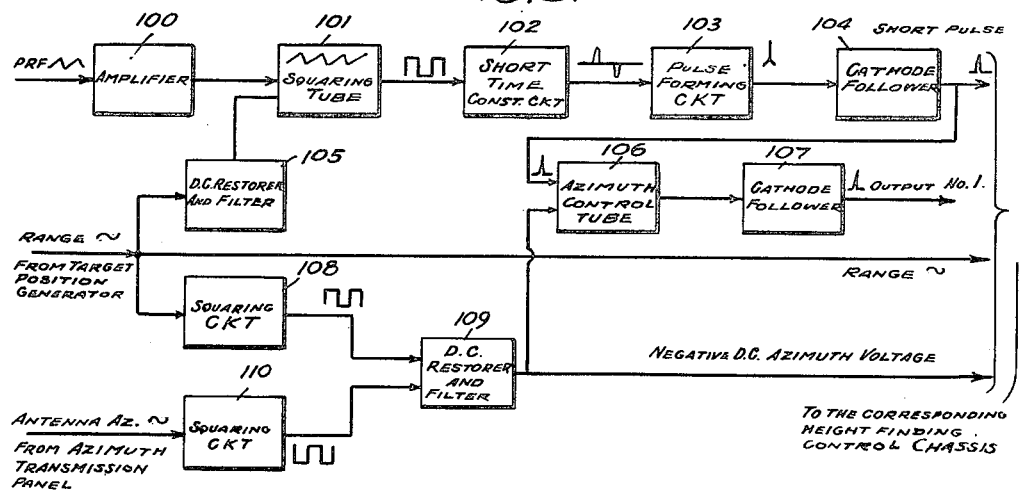
Figure 10A:
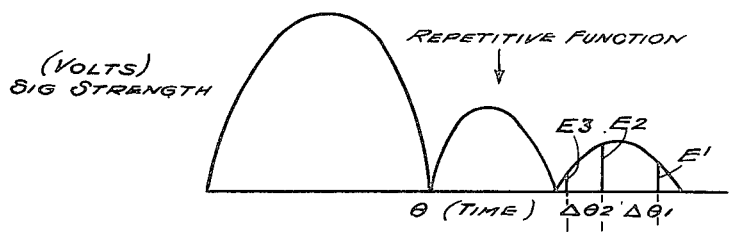
Figure 10B:
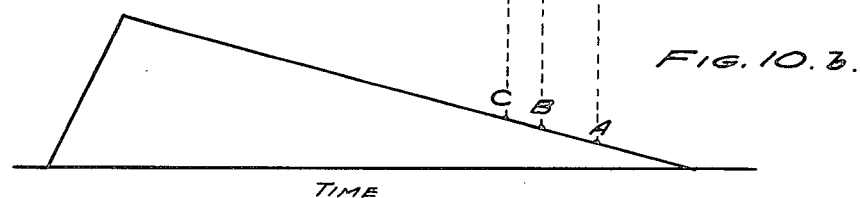
Figure 10C:
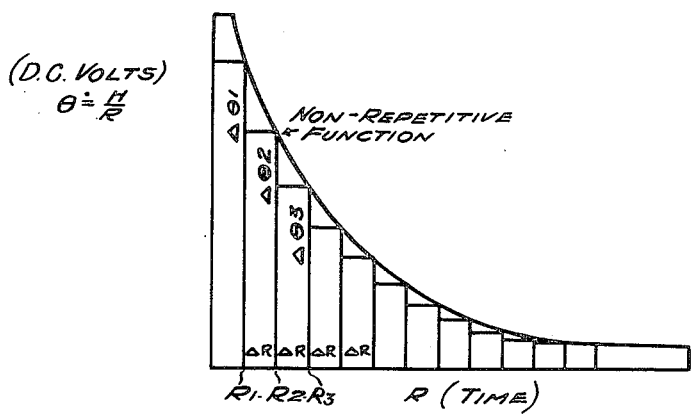
Figure 17:
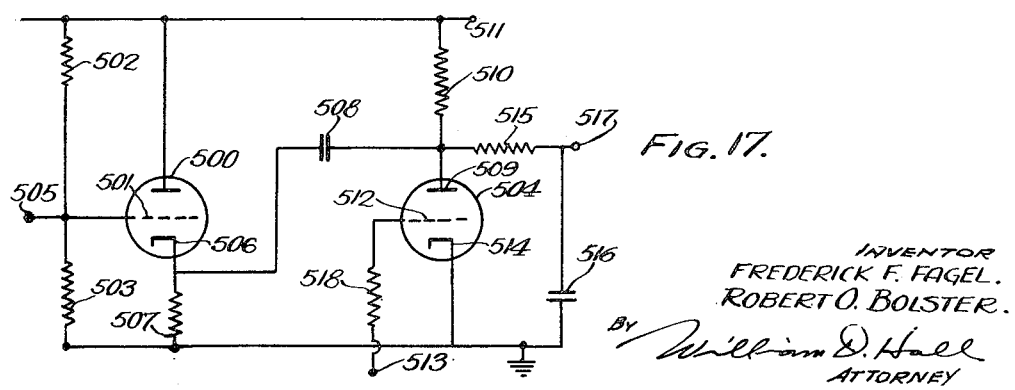
Figure 11:
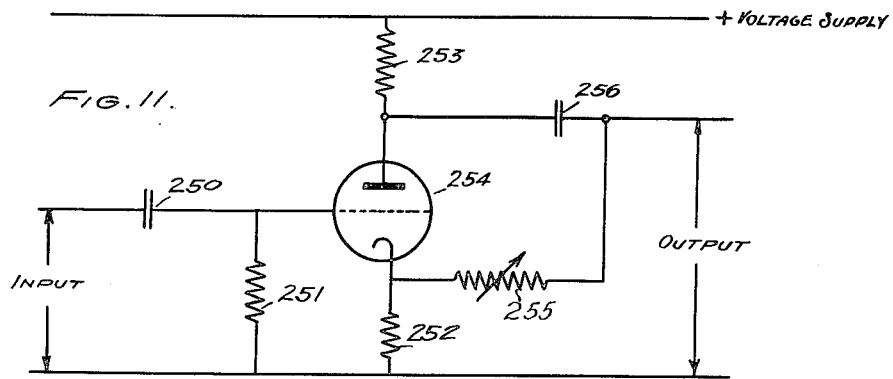
Figure 12:
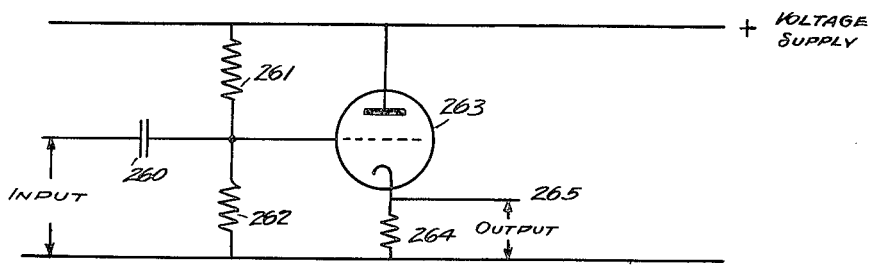
Figure 13A:
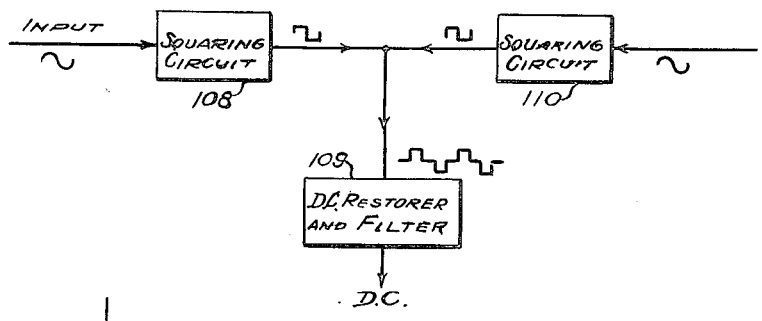
Figure 13B:
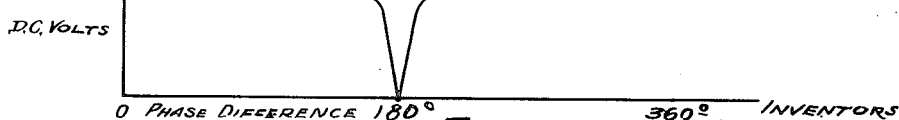
Figure 16:
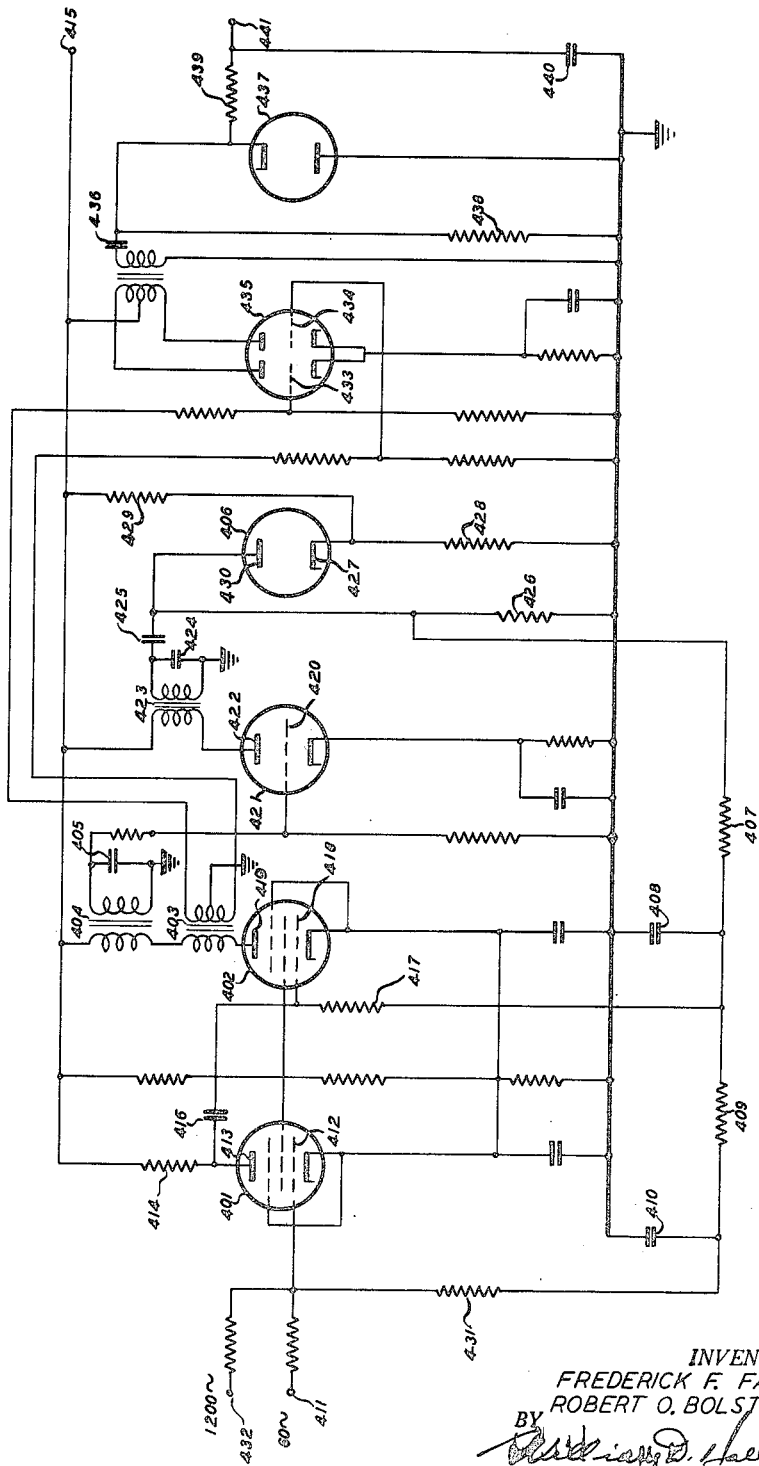

Other objects of this invention will be made more apparent as this description proceeds, wherein one form of the invention is shown, especially when considered in connection with the accompanying drawings wherein:

Figure 1 is a block diagram of the entire trainer apparatus.
Figure 2 is a block diagram of the target position generator.
Figure 2a is a vector diagram of the target position generator.
Figure 3 is a block diagram of the pulse recurrence frequency chassis.
Figure 4 is a block diagram of the azimuth transmission panel.
Figure 5 is a block diagram of the range and azimuth chassis.
Figure 6 is a block diagram of the lobe pattern generator.
Figure 7 is a block diagram of the height-finding control chassis.
Figure 8 is a block diagram of the signal switching panel.
Figure 9 is a block diagram of the output relay chassis.
Figure 10a is a graph of an equation to be solved electrically by the trainer.
Figure 10b is a graph of a parameter used to solve the equation illustrated in Figures 10a and 10c.
Figure 10c is a graph of an equation to be solved electrically by the trainer.
Figure 11 is a circuit diagram of the phase shift circuit.
Figure 12 is a circuit diagram of the cathode follower circuit.
Figure 13a is a block diagram of the phase discriminating circuit.
Figure 13b is a graphical representation of the voltage relationships in the phase discriminator.
Figure 14 is a circuit diagram of a portion of the lobe pattern generator.
Figure 15 is a block diagram of the hyperbolic function circuit.
Figure 16 is a circuit diagram of the hyperbolic function circuit shown in block form in Figure 15.
Figure 17 is a schematic diagram of the slicer circuit.

A description of the general operation of the trainer is followed by specific descriptions of its components and their relations to each other.

Referring to Figure 1, the block diagram of the entire trainer apparatus, 17 is a pulse recurrence frequency chassis, the primary function of which is to synchronize the radar receivers with the radar trainer apparatus. Chassis 17 provides a sine wave 23 which is fed to the radar receivers as a synchronizing wave form. It also provides a triangular wave form voltage 18 at the same frequency as the sine wave voltage 23. It is the saw tooth voltage 18 that is fed into the range and azimuth chassis 20, 20a and 20b later described. Therefore, the time bases on the cathode ray tube indicators of the radar receivers are synchronized with the range and azimuth chassis 20, 20a and 20b of the trainer apparatus.

Target position generators 10, 10a, and 10b produce sine wave voltages 12, 12a and 12b whose amplitude is proportional to the range, and whose phase is proportional to the azimuth of a simulated target or object. The exact manner for achieving this effect will be described later. The term target as hereinafter used refers to the above mentioned simulated target or object.

Although there are three target position generators 10, 10a and 10b shown, each one identically the same, to generate some of the necessary signals to simulate one target, it is obvious that any number of target position generators may be provided, dependent upon the total number of simulated or phantom targets desired.

Each range and azimuth chassis 20, 20a and 20b receives the sine wave voltages generated by the target position generator 10, 10a, 10b and also the triangular wave form 18 from the pulse recurrence frequency chassis 17. Also introduced into each range and azimuth chassis 20, 20a and 20b is the sine wave voltage 15 which is generated in the azimuth transmission panel 14. The phase of sine wave voltage 15 from the azimuth transmission panel is utilized in conjunction with the phase of the range voltage to determine the azimuth of the target. The phase of this voltage 15 is constantly changing through 360° in step with the rotation of the radar receiver selsyns.

In an actual radar system the rotating antenna is coupled to the PPI Selsyn so that both the rotating antenna and the PPI time base revolve at the same angular velocity. In effect then, azimuth transmission panel 14 provides this function, the further action of azimuth transmission panel 14 to provide a voltage control, whereby the "target" appears at the proper azimuth on the PPI tube, is hereinafter explained.

Sine wave voltage 16 also generated by the azimuth transmission panel 14 is fed into all of the radar receivers to control said PPI selsyns of the radar receivers. The range and azimuth chassis 20, 20a, and 20b each comprise two parts, the signal circuit portion and the azimuth circuit portion. The signal circuit portion receives the triangular wave 18 and the sine wave voltage 12 which controls the triangular wave 18. This in turn is changed to a pulse output which is the range pulse 25. The range pulse is the pulse that indicates the range of the target on the cathode ray tube indicators of the radar receivers. The second portion of the range and azimuth chassis may be called the azimuth circuit portion. This receives two inputs, the sine wave 15 from the azimuth transmission panel 14, and the sine wave voltage 12 from the target position generator 10. These voltage forms are combined so that the phase difference of the two inputs is determined, resulting in a D. C. voltage whose amplitude is a function of the phase difference.

The lobe pattern generator 29 produces a plurality of voltage forms 30. These voltage forms 30, or lobe patterns as they will hereafter be called, are fed into each of the plurality of height finding control chassis 31, 31a, and 31b.

The height finding control chassis 31, 31a and 31b each receive the following inputs:

(a) A plurality of lobe patterns 30.
(b) Two opposite polarity square wave switching voltages 24 and 24a from the multivibrator 19 which in turn is controlled by the pulse recurrence frequency chassis 17.
(c) The range pulses 25 which are an output of the range and azimuth chassis 20.
(d) The sine wave voltage 25' which is also an output of the range and azimuth chassis 20.
(e) A triangular wave form 18a which may be of a different frequency than the pulse recurrence frequency.
(f) A. D. C. voltage varying linearly with range from the range and azimuth chassis.
(g) A 1200 cycle/second sine wave from the lobe pattern generator.
(h) A D. C. azimuth voltage from the range and azimuth chassis.
(i) A noise voltage.

The nine inputs to the height finding control chassis are utilized and modified so that the output of each will be a plurality of pulse signals 32 varying in amplitude in accordance with the different signal strengths obtained from the lobe patterns 30. This variation is controlled by the introduction of voltages representing range and height so that the amplitude of the pulse outputs will depend upon the variables, range, height, and lobe patterns. (Which are the same variables encountered in an actual radar system.)

These pulse signals are amplified and transmitted to the signal switching panel 35, the purpose of which is to send varying numbers of signals to each of the radar receivers; any one of which signals can be selected by the operator of the radar receiver by manipulation of the receiver antenna selection switch, and each of which signals will vary as the lobe patterns 30 vary. The signals 36 are then fed to the output relay chassis 37 which in turn transmits the signals on any one of the plurality of lines leaving it to the radar receiver to which it is connected. The choice of signals to be received is dependent upon switching at the radar receiver itself, but the actual choice of number of targets and position of target is controlled at the panels of the radar trainer equipment by the instructor.

Optional with this equipment is the noise generator chassis 39 which feeds into each height finding control chassis 31, 31a, 31b, random noise signals to simulate actual extraneous signals received and generated by the radar receiver. These extraneous signals may include atmospheric effects, random noise generated by the receiver itself, and jamming signals.

*Target position generator*

The target position generator produces a voltage whose amplitude is proportional to the range of the simulated target or object and whose phase is proportional to the azimuth of the simulated target or object. Furthermore, it is desirable that the target be made to appear initially at any desired geographic point about the radar station. The following description covers the principle involved and general method of solution.

In order to obtain a voltage at any desired phase angle, two quadrature voltages 40, 41 (Figure 2) are supplied to two potentiometers 42, 43. The arms of these potentiometers are connected to a sine and cosine cam respectively, both of which are mounted on the same shaft 44. If then the shaft is rotated to some position by the instructor's control wheel 45, the sine and cosine cams will cause voltages to be impressed across the potentiometers that are proportional to the sine and cosine of the angle of rotation of the shaft 44. There will then be a different ratio of sine to cosine for each position of the cam. We knows that this ratio is equal to the tangent of the angle of rotation. If now these two quadrature voltages 40', 41' which form the output of the sine and cosine cam controlled potentiometers, 42 and 43 respectively are added we have a voltage whose phase is dependent upon the position of the cams, and a dial may be mounted on the cam shaft 44 calibrated to read phase angle. The principle just outlined is one by which we alter the bearing of the course of the target and said dial on cam shaft 44 reads the bearing of the course. It is also necessary to have the amplitudes of the cam-controlled potentiometer output voltages 40' and 41' vary with distance of the target. We know distance=velocity×time, therefore we need only to have the amplitude vary with time, the rate of variation being velocity. This is done in the following manner. The quadrature voltages 40', 41' are not added immediately but rather are applied respectively to two motor driven potentiometers 46, 47 mounted on the same shaft 48. The ratio of the voltages 40' and 41' impressed on the potentiometers 46, 47 respectively, is the same as that set up by the cam controlled potentiometers 42, 43. Now as the motor revolves the arms of these potentiometers, the ratios of the output voltages of the motor driven potentiometers 46 and 47 will remain the same but the magnitude of each will increase. The speed of the motor determines the speed of the target or object. If then these two last mentioned quadrature voltages are added we will have solved the problem of having a voltage vector whose amplitude varies with distance (time) and whose phase angle can be controlled and represents the azimuth of the target. These last mentioned quadrature voltages are not added directly however as additional features are desired. In this embodiment the sum of the two quadrature voltages represents the bearing of the course of the target.

It was previously mentioned that the feature of having the target start at any geographic position with respect to the radar station was also desirable. The problem then, is to add an initial vector to the one previously mentioned, at some fixed range and azimuth. This is done quite simply by adding quadrature voltages 51 and 52 of fixed amounts to the outputs 53 and 54 from the motor driven potentiometers 46 and 47. These added quadrature voltages may be represented as $V_x$ preset and $V_y$ preset. The voltmeters 49 and 50 indicating the total quadrature voltages (51 plus 53) and (52 plus 54) respectively may be referred to as the Y and X meters respectively, and each of these may be calibrated in coordinates rather than volts thereby allowing us to read voltages that actually represent the coordinates of the starting point of the target (i. e. where the target will first appear on the PPI tube). In order that we could start at any point 360° around the radar station it would be necessary to have each of these quadrature voltages to change phase 180°. To prevent this we merely measure all voltages from some point (0, 0) which is not at the station. The whole area around the station itself is is a quadrant whose origin is at (0, 0). We wish however to measure all voltages with respect to the station and not (0, 0).

It is then necessary to subtract the quadrature voltages that determine the position of the station relative to (0, 0). To perform this subtraction, a voltage 55 of opposite polarity to 40 and a voltage 56 of opposite polarity to 41 are proportioned by station preset control 57 and station preset control 58. All quadrature voltages are then added in summation amplifier 59, the output of which is then sent to the range and azimuth chassis 20, 20a, and 20b.

Figure 2A is a pictorial representation of the voltage vectors which position the simulated target with respect to the simulated radar station. It will be remembered that voltage vectors are being measured with respect to an arbitrary point represented as (0, 0). $V_{SP}$ (starting point) is a vector representing the initial position or starting point of the target relative to (0, 0) and has two quadrature components $V_x$ preset and $V_y$ preset. Subtracted from $V_{SP}$ is a vector $V_{RS}$ (radar station) which has two components $V_x$ station and $V_y$ station and represents the position of the radar "station" with respect to (0, 0). The result is a vector $V_{SS}$ which represents the starting point of the target relative to the "station." Added to $V_{SS}$ is a vector $V_{BC}$ which is a vector depicting the bearing of the course of the target and has two quadrature components $V40'$ and $V41'$. The resultant vector is then $V_T$ and is a vector whose magnitude represents the distance or range of the target with respect to the station and whose phase angle represents the azimuth.

Pulse recurrence frequency chassis

Referring to Figure 3, it is seen that the primary function of this portion of the equipment is to establish signals for the synchronization of other portions of the trainer as well as synchronizing the radar receivers with the trainer. Another function is to produce adequate switching voltages of square wave form and also a D. C. switching voltage for the output relay chassis. There is also generated a triangular wave form of a frequency which may be different than the master oscillator in the pulse recurrence frequency chassis. A master oscillator 60 of the resistance-capacitance type generates a sine wave voltage which forms the basic synchronizing voltage for the entire trainer equipment and the radar receivers on which training operations are to be performed. The sine wave voltage from master oscillator 60 is amplified by amplifier 61 and two outputs are obtained, 61a which feeds a synchronizing sine wave voltage to all radar receivers, the other output being fed to phase shifter 62, the operation of which will be hereinafter explained. After being shifted in phase, one portion of the output is sent through two squaring circuits 63, 64 of conventional type, an integrating circuit 65 and a cathode follower circuit 66 from which the triangular wave form 18 (Figure 1) then enters the range and azimuth chassis 20, 20a and 20b.

Another output from phase shifter 62 is fed through a conventional squaring circuit 67 and is then fed as a locking voltage into multivibrator 19 which operates at a frequency one-half of that of the master oscillator 60. The multivibrator output is then fed into a plurality of cathode follower circuits 68, 69 and 70 of a type hereinafter described. The outputs of the cathode follower circuits 68 and 69 are two square wave voltages 180° out of phase, while the output of cathode follower 70 is in phase with the square wave voltage issuing from 69. The output of 70 is fed to the radar receivers to be used as a means of displacing the time bases on the radar receiver indicator tube on which height-range information is indicated. The outputs of 68 and 69 are fed into the height finding control chassis 31, 31a and 31b to be used as a switching voltage. A 110 v.-60 cycle voltage is fed into phase shift transformer 71, then through wave squarers 72, 73, through integrating circuit 74, amplifiers 75, 76 and finally through cathode follower circuit 77, the output of which is a 60 cycle triangular wave form which is fed to the height finding control chassis 31, 31a, 31b. Also, the 60 cycle 110 v. supply is rectified in rectifier circuit 78 to give an output of D. C. voltage to be fed to output relay chassis 37 where it acts as a bias for the tubes therein.

Azimuth transmission panel

The azimuth transmission panel 14 is utilized to synchronize the PPI selsyn in each radar receiver with the azimuth circuit of range and azimuth chassis 20, 20a, and 20b. It also produces a sine wave voltage whose phase continually rotates through 360° in the PPI selsyns in the radar receivers. The azimuth transmission panel 14 comprises two sections which are closely similar, one to be used for high speed, the other for low speed phase rotation.

Referring to Figure 4, it is seen that both the low and high speed sections each comprise a motor 80 which drives a master selsyn 84 through a variable speed drive 82. The output of the master selsyn 84 is fed to each radar receiver to control and synchronize the PPI selsyns in each receiver. Both the low and high speed sections also have a small selsyn 83 also driven by motor 80 through the variable speed drive 82. The angular position of small selsyn 83 is indicated by an azimuth dial 85. The output of small selsyn 83 is then fed into the range and azimuth chassis 20, 20a and 20b. Switches 85' and 86 are used to utilize either the low or high speed portions of azimuth transmission panel 14.

In order to secure a single phase voltage, the phase of which is constantly changing through 360°, at the same rate at which the PPI selsyns rotate, a 3 phase voltage is fed into the stator of small selsyn 83. The voltage taken from the rotor will then change in phase according to the angular position of the rotor which in turn is connected to variable speed drive 82. This voltage is hereinafter referred to as the azimuth voltage vector.

Range and azimuth chassis

The range and azimuth chassis 20, 20a and 20b each comprise two parts, an azimuth circuit and a signal circuit. The azimuth circuit has two inputs, namely the sine wave range voltage from the target position generator 10, 10a, 10b and the sine wave azimuth voltage at the same frequency from the azimuth transmission panel 14. It should be remembered that the phase of the azimuth voltage vector is continuously changing through 360°, whereas the phase of the range voltage depends upon the azimuth of the target. In this particular embodiment of the invention the essential principal in determining azimuth is to have a means of measuring the phase difference of these voltages, said measurement being converted into a D. C. voltage whose amplitude will vary with the phase difference. Referring to Figure 5, one manner of accomplishing this desired result is as follows:

The range voltage is fed through a squaring circuit 108. The output of the circuit 108 being a steep-sided square wave whose amplitude is substantially constant over a wide range of input voltage. The azimuth vector feeds through a squaring circuit 110. The output of the circuit 110 likewise is steep-sided square wave whose amplitude is substantially constant. The only difference between the azimuth square wave and the range square wave is their phase. If now, these two square waves are added together, we will get a complex wave form whose peak amplitude is nearly constant except when the two square waves are nearly 180° out of phase. Theoretically, at 180° phase difference the two waves should cancel one another and we should have zero voltage. If we D. C. restore this complex wave form and filter it by D. C. restorer circuit 109 we will get a D. C. voltage whose amplitude is proportional to the peak value of the complex wave form.

For a given position of the target, we will get a particular range voltage whose phase and amplitude are dependent upon the position of the target. If now the azimuth vector revolves through 360° we would get a negative D. C. voltage from the D. C. restorer and filter 109 that would have roughly the shape shown in Figure 13b. Considering D. C. voltage plotted versus azimuth, we would find that the D. C. voltage stayed nearly constant until the range voltage and the azimuth voltage were nearly 180° out of phase. At this point we would find the D. C. voltage starting to drop very rapidly, reaching a minimum when the two square waves are 180° out of phase. As the azimuth further increased, the voltage would rise rapidly attaining its former magnitude that would stay nearly constant.

This azimuth voltage is sent to the height finding control chassis 31, 31a, 31b and also to the grid of azimuth control tube 106, mentioned hereinafter. The signal circuit portion of the range and azimuth chassis receives a triangular wave 18 from the pulse recurrence frequency chassis 17. This triangular wave is fed through a linear amplifier 100 and then fed into a squaring circuit 101, the output being a square wave whose width may be varied and which is sent through a short-time constant circuit 102. The output of circuit 102 is a positive and negative going pulse the positive portion of which is used to trigger a gas tube in pulse forming circuit 103. The output of the latter being a short duration range pulse which is then sent through a cathode follower 104, from which it is fed to the height finding control chassis 31, 31a, 31b. The final output of the signal circuit is a very narrow positive going pulse.

Also available as an output from cathode follower 104 is a short duration, very narrow positive going pulse that may be sent through azimuth control tube 106 and cathode follower 107. Feeding into the grid of azimuth control tube 106 is a positive going, very narrow pulse. The azimuth voltage described above is also sent into the grid as a bias, whereby the tube transmits the narrow signal to the cathode follower only when the D. C. azimuth bias voltage rises sufficiently to allow the tube to conduct. This latter output may be used when training is desired on range and azimuth presentation only, and where height finding information is not necessary or desirable.

The short pulse issuing from cathode follower circuit 104 is made to vary with time linearly proportional to range voltage and thus provide indication of range (i. e. the pulse can appear on a cathode ray tube indicator). This is accomplished in the following manner. The sine wave range voltage from the target position generator 10, 10a, 10b is passed through a D. C. restorer and filter circuit 105 resulting in a D. C. voltage directly proportional to range. This D. C. Voltage is applied to height finding control chassis 31, 31a, 31b, and also applied as bias to the grid of the squaring tube 101. The result of applying said D. C. voltage to the grid of tube 101 is that the width of the square wave issuing therefrom is modified in direct proportion to the aforesaid range voltage. The square wave in passing through the short time constant circuit 102 results in a positive pulse which coincides with the leading edge of the square wave. Thus the positive pulse position with respect to time will vary directly as the width of the modified square wave and hence range.

One of the objects of this trainer is to produce signals or pulses which when viewed on the height-range indicator tube of the radar receiver will vary in amplitude in substantially the same manner as would actual signals reflected or reradiated from an aircraft or object. We know, however, that a number of variables or conditions determine the amplitude of this signal, namely: the overall lobe pattern, the height of the object above ground, and the distance or range of the object from the antenna. In order to attain our object it is necessary that the variables height, range, and overall lobe pattern be considered in our solution to the problem. Two simple yet basic equations will be introduced in order to solve this problem.

The signal strength at a point in space due to the radiation of a horizontally polarized dipole at a distance $h$ above a reflecting plane such as the earth, is given by the following equation (1) $$E = 2M \text{ sine}\left(\frac{2\pi h \text{ sine } \theta}{\lambda}\right)$$

in which $E$ = signal strength
$M$ = radiation constant
$\lambda$ = wavelength in feet
$\theta$ = angle of sight
$H$ = height of antenna above ground in feet.

Since the angle of sight is very nearly directly proportional to the sine of the angle of sight up to 30° it is possible to rewrite Equation 1 as (2) $E = 2M$ sine $(Kh\theta)$ where $$K = \left(\frac{2\pi}{\lambda}\right)\left(\frac{\text{sine } \theta}{\theta}\right)$$

and may be considered a constant up to an angle of sight of 30°.

Thus the lobe pattern is seen to vary as the sine of some multiple of the angle of sight ($\theta$) up to an angle of sight ($\theta$) of 30°. With present radar equipment it is not customary to work at angles of sight ($\theta$) greater than 30°. Consequently, for this particular trainer 30° will be considered the maximum angle of sight ($\theta$) at which we will work.

At this point of the discussion we have considered in a general manner one of the three variables mentioned earlier, namely, the overall lobe pattern, and have in addition introduced a new variable $\theta$. We will now consider a second fundamental equation:

(3) Range $\times$ sine $\theta$ = height or as it is usually written, (4) $$\text{Sine } \theta = \frac{\text{height}}{\text{range}}$$

We have previously mentioned that we are working only to an angle of sight of 30° therefore (4) can be written (5) $$\theta = K_1 \frac{\text{height}}{\text{range}}$$

If now we consider height as a constant we will find that Equation 5 is then an expression for a rectangular hyperbola. Upon inspection it can be seen that changing height merely changes the constant in the equation thus giving a new hyperbola for each height. It will be shown later how height can be varied so as to produce a hyperbola for any height. However, for the basis of discussion we will consider height as being fixed.

This second equation thus shows us that for any height we will get $\theta$ as a function of range. If we wish we can also change height, therefore we can truly say that we have an expression that introduces the last two of the original three variables mentioned. The two equations we now have are then:

(6) Signal strength = $E = 2M$ sine $(Kh\theta)$ (7) $$\theta = K_1 \frac{\text{height}}{\text{range}}$$

The $h$ in (6) is the height of the antenna above ground and should not be confused with H in (7) which is the height of the object or target "seen" by the radar. Equations 6 and 7 then contain all the variables that must be considered in order to portray the changing amplitude of a signal. If the mythical aircraft or object is at a constant height the only variable appearing in Equations 6 and 7 that we have available in the target position generator is range. We, therefore, wish to have signal strength vary with range for a fixed height. From (6) and (7) we can see that if we solved these equations simultaneously we would have signal strength as a function of range. The problem then is to solve these simultaneously by some electrical means. The solution must be automatic so that as range changes we will always have the correct value of signal strength. Also if the height is changed the solution will automatically change to give the correct answer. This problem is solved electrically by the following method. Although in this particular case we have the equations for a lobe pattern and a hyperbola the method is perfectly general and may be used to solve other equations providing they can first be set up electrically, i. e. have a voltage whose amplitude varies as the function.

Rewriting (6) and (7)

(6) Signal strength $(E) = 2M$ sine $(Kh\theta)$ (7) $$\theta = K_1 \frac{\text{height}}{\text{range}}$$

Mathematically these two equations may be solved simultaneously by substitution of Equation 7 in Equation 6, obtaining thereby signal strength directly in terms of range for any given height.

If a voltage varying in a manner that follows the function of (6) and another voltage that follows the function of (7) can be obtained, the simultaneous solution of the two equations may be obtained, the solution being represented by a voltage.

In the present case we must first obtain a voltage ($\theta$) where said voltage will have a magnitude dependent upon height and range in accordance with Equation 7. The voltage representing ($\theta$) must then be made to act upon a circuit associated with the circuit producing the voltage function (6), in such a manner as to produce a voltage corresponding to the simultaneous solution of the two equations.

The electrical solution, however, is complicated somewhat by the fact that the counterpart of the angle of sight ($\theta$) may not be of the same physical nature in the two equations. For example, in one case the quantity ($\theta$) may be represented by a voltage, while in the other case it may be represented by time. The solution can be effected, however, if the angle of sight ($\theta$) is reduced to the same physical nature in both equations, and this may be done by the introduction of a parameter such as time ($t$).

In general, the equations may be solved electrically by recourse to the following steps. For ease of description the Equations 6 and 7 will be referred to, but it is to be understood that the method is applicable to other equations:

(1) Obtain the dependent variable (E) of Equation 6 as a voltage that is a function of time, $f_1(t)$ and where $t$ may then represent the independent variable ($\theta$) of Equation 6.

(2) Obtain the dependent variable ($\theta$) in Equation 7 as a voltage which is a function of time, $f(t)$.

(3) So correlate $f(t)$ and $f_1(t)$ that the voltage ($\theta$) determined by $f(t)$ acts upon the circuit producing the voltage $f_1(t)$ whereby the correct value of E is determined.

As the description to this point is quite general, the actual electrical means of doing this may not be evident.

The following is a description of the method used in this trainer. It should be kept in mind that although we are here describing a specific embodiment, the basic combination of circuits employed may be used to solve other equations by an electrical means. Fig. 10a represents a lobe pattern, such as may be applicable to this trainer and the basic equation of which is represented by Equation 6. Fig. 10c graphically represents the function of Equation 7. Fig. 10b represents an electrical parameter introduced to correlate the functions represented by Figs. 10a and 10c.

Referring now to the first step, a cyclical voltage that varies with time $(t)$ is obtained, the wave form of this voltage being substantially the same as a graph representing the function of Equation 6. This graph (signal strength E vs. angle of sight $\theta$) is shown in Fig. 10a. Thus the time axis of this wave form corresponds to angle of sight ($\theta$), and the magnitude of the wave form corresponds to signal strength. The voltage magnitude of the cyclical voltage thus varies with time in a manner that follows the function of Equation 6. Hence we may say that Equation 6 has been represented electrically wherein time $(t)$ replaces the independent variable $(\theta)$ of said equation. The equation can now be written:

Signal strength $(E) = 2M$ sine $Khf_1(t)$ in which M, K, h and E are as stated previously.

In the second step, it is necessary to generate a voltage ($\theta$) which, as stated, is proportional to $$\frac{\text{height}}{\text{range}}$$

as ($\theta$) is inversely proportional to range, and the range of a continuously moving target is proportional to time $(t)$, then $(\theta)$ is inversely proportional to time $(t)$.

To be sure, ($\theta$) changes slowly with time, but the rate of change is not important, providing this function of time may be related to the function of time as expressed above in Equation 6.

Equation 7, which is represented by Fig. 10c, is in this embodiment a D. C. voltage whose amplitude varies with range. It is a non-repetitive function and Fig. 10c may be considered to be a plot of $\theta$ (which is a D. C. voltage) vs. range.

The wave form represented by Fig. 10b is introduced in order to relate the value of $\theta$ as determined by the independent variable, range, with the $\theta$ of Equation 6, which is a function of time. A detailed description follows which covers one specific embodiment and which will clarify the general method of solution as heretofore described.

Figure 10b represents a triangular wave with the negative going side being linear. This triangular wave, as will be seen, is used as a parameter. In solving other types of equations the positive going side may be the one that should be linear. The frequency of this triangular wave should be equal to, or some multiple of, the repetitive frequency of the lobe pattern. Based on the preceding discussion and reference to Figures 10a, 10b, 10c the following description is concerned with the actual method employed. The hyperbola operates first on the triangular waveform, the result of that operation being utilized to operate on the lobe pattern. A thorough understanding of the action of the hyperbola on the triangular waveform is necessary.

If a linear triangular wave is introduced to the grid of a conventional squaring tube and a D. C. voltage following some function of time is applied to said grid as a bias, then one side of the square wave produced at the anode will move a distance with respect to time proportional to the change in bias. As an example refer to Figure 10b and Figure 10c and assume for the moment range is a specific value $R_1$. For this value of $R_1$ we get a voltage that represents a specific value of $\theta$ and which is applied to the squaring tube as a bias. This bias then determines the point along the linear portion of the triangular wave at which "squaring" takes place. Let this point be A on Figure 10b. If now $R_1$ is changed an amount of $\Delta R$ thereby making R equal to $R_2$ then $\theta$ is changed an amount $\Delta\theta$ and the triangular wave now squares at B, where the distance AB is proportional to $\Delta\theta$. If the range is further increased to $R_3$ then $\theta$ is changed an amount $\Delta\theta_2$, and a new squaring position C on the triangular wave is obtained. The distance BC is proportional to $\Delta\theta_2$. If the process is continued we find that the squaring point of the triangular wave changes an amount proportional to the change in bias which in this case is called $\Delta\theta$. If the square wave output from the anode of the squaring tube is sent through a short time-constant circuit a sharp pulse will be obtained that coincides with the appropriate point A, B, or C, etc., as determined by range. If this pulse were viewed on an oscilloscope we would find that for equal incremental changes of R the pulse would move along the time base a distance proportional to $\Delta\theta$. This is an important factor in the solution of the problem.

Now as the triangular wave is at the same, or a multiple of the repetitive frequency of the lobe pattern, then the distance AB or BC in Figure 10b is proportional to a change $\Delta\theta_1$ or $\Delta\theta_2$ in Figure 10a. Or with R at $R_1$ squaring occurs at A. As a function represented by Figure 10a is synchronized with the function represented by Figure 10b, then when the pulse occurs at A, the instantaneous value of the function represented in Figure 10a is $E_1$. Now if range is increased to $R_2$ then squaring occurs at B and the pulse occurs at B, and the instantaneous value of the function represented by Figure 10a is $E_2$.

Remembering that Figures 10a and 10b represent functions that are synchronized, consider the previously mentioned pulse as being a "marker" whose position changes with respect to time (range) a distance proportional to $\Delta\theta$ of Figure 10c. The ordinate $\theta$ of Figure 10c can be calibrated in degrees as can the abscissa of Figure 10a. Then by properly adjusting circuit constants the $\theta$ of Figure 10a can be calibrated against the $\theta$ of Figure 10c. An example may make this clearer. Suppose range is such as to give an angle of sight ($\theta$) of 30°, then the voltage representing this angle is applied to the triangular waveform as previously described. The pulse produced will then be in such a position as to "point" at 30° on the lobe pattern waveform (Fig. 10a). If now range changes, thereby changing $\theta$ to 20°, the pulse will move along until it "points" to 20° on the lobe pattern. In other words as range changes the net result is that the pulse produced moves to the correct value of $\theta$ on the lobe pattern and we have now only to get a voltage equal to the ordinate corresponding to that value of $\theta$. The pulse described in this discusion will hereinafter be referred to as the "slicing" pulse in order to prevent confusion with the previously mentioned very narrow pulse that represents range. This is so-called as it is utilized to "slice out" a narrow section of the lobe pattern thereby obtaining an ordinate thereof. This is accomplished in a circuit to be described later, and is referred to as the "slicer circuit."

The foregoing illustration necessitates the introduction of a parameter for solving the two equations simultaneously for the reason that one of the equations is represented by a non-repetitive function. However, if both equations are represented by repetitive functions, they may be solved electrically in a simultaneous manner without the introduction of a parameter as described above. This may be done simply by utilizing one repetitive function in a squaring tube and using the pulse thereby obtained from the square wave directly as a slicing pulse as explained above.

*Lobe pattern generator*

It is a known fact that any repetitive waveform may be represented by a Fourier series, the general expression for such a series containing both sine and cosine terms and the individual component frequencies for such a series being multiples of some fundamental frequency. Any repetitive waveform may then be produced by adding a sufficient number of trigonometric functions and necessary constants. Using this as a basis any complex repetitive voltage waveform may be produced in the following manner:

The equation of the waveform desired is first obtained as a series with enough terms to provide a sufficiently good waveform. These components may be either sine terms or cosine terms or both, depending upon the functions desired. Each term though will be a harmonic of some fundamental frequency. To form the sine function electrically, oscillators at the fundamental and necessary harmonic frequencies are constructed and locked together in synchronism. Cosine terms are formed in the same manner but the waveform is phase shifted ninety degrees with respect to the outputs of the sine wave oscillators. If then the outputs of, for example, the sine wave oscillators are sent to phase splitters we can obtain sine waves that are in the same phase and also antiphase with respect to the oscillator wave forms. The same thing may be done with the cosine waves. In this manner, the output of the phase splitter may represent either a positive or negative sign of the output of the oscillator.

For example: suppose we have two simple series such as $$(\text{sine } A \text{ plus sine } B) = E_1$$
$$(\text{sine } A \text{ minus sine } B) = E_2$$

Then if the sine wave representing sine B is sent to the phase splitter the in-phase output will represent plus sine B and the antiphase output will represent minus sine B. If then the outputs of the various phase splitters are proportioned properly and any necessary constants added, they may be added together to provide any waveform desired.

One specific object of this trainer is to provide voltage waveforms that will represent lobe patterns of various antennas. It is a well known fact that the equation of a lobe pattern that gives the signal strength at a point in space due to a horizontally polarized dipole is a trigonometric function. The complex function was obtained for each lobe pattern desired. Well known trigonometric identities were applied to these equations resulting in new equations containing only cosine terms and constants. Each component of this equation represented a frequency that was a harmonic of some fundamental. In the specific embodiment herewith a fundamental frequency of sixty cycles was chosen and six oscillators at harmonic frequencies of sixty cycles were sufficient to provide all the necessary frequencies. However it is to be specifically understood that any convenient fundamental frequency may be used. These oscillators were then so synchronized and locked as to produce cosine waveforms. These in turn were sent to phase splitters, properly proportioned and added in order to produce a voltage waveform that contained all frequencies in the proper proportion. Constants in the equation were then added electrically and the resulting waveforms were those of the lobe patterns desired. In an electrical representation a constant may be supplied by adding a D. C. voltage component.

In Figure 6, the block diagram of the lobe pattern generator 29 a 60 cycle sine wave is fed through the phase shift and locking circuit 120, the output of which is sent through a short-time-constant circuit 121 which produces sharp pulses. These pulses are then fed into oscillator circuit 122. The phase shift circuit 120 permits phase shift of the oscillator 122 and by this means the synchronization of all oscillators may be obtained. The output of each oscillator 122 is fed to an AVC circuit 123 in order to maintain substantially constant amplitude of the oscillations. The oscillator outputs are adjusted to equal amplitude and each fed to a phase inverter or splitter 124 where a plurality of outputs are obtained, which fall into two categories, those outputs in phase, and those in antiphase relationship to the oscillator output. In addition, these outputs are also proportioned by this circuit so that by adding them with the outputs of other phase splitter circuits as may be necessary to form the correct electrical output to conform to the desired lobe pattern equation. In the specific embodiment shown in Figure 6 there are 12 phase splitters 125, each one being for a separate and distinct lobe pattern equation. In each phase inverter or splitter 125 there are two outputs, one in phase with the input, the other anti-phase with the input. As explained more fully later, these outputs are fed into the circuit 126 where they pass through a duotriode vacuum tube having a common anode load, whereby the inputs are acted upon as by a class B amplifier. Also, any constants necessitated by the lobe pattern equation are added at this point. Therefore, the final output of the lobe pattern generator is a voltage whose amplitude varies with time in accordance with the lobe pattern represented by a particular equation. From the last phase splitting circuit 124e one of the outputs is sent through a cathode follower circuit 128 from which is then taken a 1200 cycle sine wave voltage for use in the height finding control chassis 31.

*Height finding control chassis*

The height finding control chassis 31, 31a, 31b is in effect, the device in which all the variables, which are expressed as some form of voltage wave form, are fed. These voltage waveforms are then acted upon in such manner that the outputs of this chassis are the final signals that are fed to the radar receivers via the signal switching panel 35 and output relay chassis 37. It is in this portion of the system that the simultaneous solution of lobe equations $$\text{Signal strength} = 2M \sin\left(\frac{2\pi h \sin\theta}{\lambda}\right)$$

and the hyperbolic equation $$\theta = K_1 \frac{\text{height}}{\text{range}}$$

is obtained. The height finding control chassis contains a "hyperbolic" circuit portion whose function is to supply a voltage that varies hyperbolically with range. Into this circuit is fed a 1200 cycle per second sine wave and a 60 cycle per second sine wave, the latter representing range and being one of the outputs of the range and azimuth chassis 20, 20a, 20b. The former is utilized in the circuit in a manner hereinafter described. In Figure 7 these two voltages are fed into a variable gain stage linear amplifier 200 where the 1200 cycle voltage output is made to vary hyperbolically with the 60 cycle range voltage. The two voltages, 1200 cycle and 60 cycle respectively, are separated by filters 201, 202 after which the 1200 cycle voltage is D. C. restored and filtered in circuit 204. The output of circuit 204 therefore, is a D. C. voltage whose magnitude varies hyperbolically with range. The voltage output of circuit 204 is controlled by a potentiometer hereinafter referred to as the height control potentiometer. By varying this potentiometer with hand control 207 a separate hyperbolic function for each height may be obtained. By this means the mythical target may be placed at any height desired by the trainer equipment operator. This voltage is fed to the grid of a squaring tube in squaring circuit 205 as a bias. Also fed into the grid of the squaring tube is a triangular wave voltage of 60 cycles per second from the pulse recurrence frequency chassis 17. This the parameter voltage waveform discussed in the explanation of the solution of the two simultaneous equations. Squaring circuit 205 output is then a square wave whose width is dependent upon the bias, which bias is a hyperbolic function as explained above. The square wave is then fed into the short time-constant circuit 206, the output of which is the "slicing pulse." The principle of action of circuits 205 and 206 have been previously explained. Also fed into the height finding control chassis are 12 different lobe pattern voltages. Each lobe pattern voltage is fed into a cathode follower circuit 208 and then into a slicer and filter circuit 209, into which is also fed the output "slicing" pulse from the hyperbolic circuit portion previously mentioned. In the slicer and filter circuit 209 the "slicing" pulse performs the function of obtaining a voltage that is proportional to the instantaneous value of the ordinate of the lobe pattern that corresponds to θ (angle of sight) at that particular instant which in turn is dependent upon the range and height of the target. The "slicing" action is hereinafter explained. The output of slicer and filter circuit 209 is a D. C. voltage varying in amplitude, which is in effect the ordinate of the lobe pattern voltage that has been determined by the range and height of the target. This is then fed into pulse amplitude control circuit 210 as a bias voltage. Also fed into circuit 210 is a narrow range pulse from the range and azimuth chassis 20, 20a, 20b. The output of pulse amplitude circuit 210 is a narrow negative going pulse, whose amplitude is dependent upon the bias voltage applied from slicer and filter circuit 209, which is fed into azimuth control 211 along with the negative D. C. azimuth voltage. The azimuth control 211 may include an amplifier tube circuit biased to cut off. The output from azimuth control 211 is a narrow negative going pulse which occurs only when the changing D. C. voltage applied as a bias to the azimuth control tube from the range and azimuth chassis 20, 20a, 20b rises to a point where the azimuth control tube may conduct. When this conducts the pulse output will appear on the cathode ray tube indicators of the radar receivers at the correct azimuth. This pulse then is sent through video amplifier 212 and cathode follower 213. The output of each cathode follower circuit 213 is fed into signal switching panel 35. The pulse switching circuit 215 is utilized to alternately switch from the output of one lobe pattern slicer circuit to another where the "antenna" arrangement is such that two different height portions of the "antenna" are used at different time intervals, for the purpose heretofore explained. Also fed into each height finding control chassis, from each range azimuth chassis, is a D. C. voltage whose amplitude varies linearly with range. This voltage is applied to the video amplifier 212 in such manner as to make the gain of this amplifier decrease as range increases.

Signal switching panel

Referring to Figure 8, the input of the signal switching panel comprises 8 signals from each height finding control chassis 31, 31a, 31b each signal being of a different amplitude. From these signals the operator may choose any one, depending upon which position the antenna selection switch of the radar receiver is placed. All eight signals represent one target hereinafter collectively referred to as a target signal and shown as either input 1, 2, or 3 in Figure 8, but the amplitude of each signal differs as a particular lobe pattern. It is desirable to be able to send varying numbers of target signals to the receivers, and in this specific embodiment a total of three target signals shown as 1, 2, and 3 in Figure 8 may be sent. Therefore, each of the three inputs from each height finding chassis 31, comprises 8 different signals or a total of 24. The number of target signals to be fed to each radar receiver is controlled by the instructor's (trainer operator) switches 150, 151, 152, which control the number of target signals to be fed to trunk 1, trunk 2, and trunk 3 respectively. There are 24 tap switches 153, one switch for each radar receiver. Each switch 153 has 3 positions or taps so that each radar receiver may be fed from one to three target signals. Each target signal has 8 different lobe patterns, the latter being selected at the radar receiver as heretofore explained.

Output relay chassis

The input to the relay chassis 37 comprises a plurality of target signals that may vary from one to three, the quantity being controlled at the signal switching panel 35. Each target signal, as has been heretofore explained, comprises 8 different signals, each separate and distinct as each lobe pattern is separate and distinct. There is one complete output relay chassis for each radar receiver, the block diagram in Figure 9 showing the circuit for a single output relay chassis. Although 8 lines are shown at the input, a total of 3 target signals, or 24 separate and distinct signals will always occur at a different time because they will be made to represent targets at different ranges. Each signal input is fed to a separate cathode follower circuit 170 which is normally biased beyond cut-off. Also feeding into each cathode follower circuit 170 are bias control lines from the radar receiver antenna control switches, eight in all since each receiver may have 8 different antenna combinations, or 8 different lobe patterns. When the trainee at the radar receiver places the antenna switch at one position, it causes the cut-off bias to be removed from the tube in that particular cathode follower circuit thereby permitting only that signal to be passed into the radar receiver.

Variable phase shift circuit

The variable phase shift circuit appearing as 62 in the pulse recurrence frequency chassis 17 (Figure 3), and as 120 in the lobe pattern generator 29 (Figure 6), will now be explained in detail. This circuit was devised to replace the conventional center-tapped transformer phase shift circuit due to the fact that such a circuit absorbs too much power for the present application. Our phase shift circuit absorbs very little power and is well suited for many applications other than herein described. Referring to Figure 11, a circuit diagram of our phase shifter is disclosed. The values of condenser 250 and resistor 251 are not critical but resistor 251 is usually of such value as to present a high impedance to the input. The values of resistors 252 and 253 are not critical and are dependent upon the type of vacuum tube to be used; however, the values of 252 and 253 should be equal. 255 is a variable resistor, the value of which may be changed to obtain the phase angle shift that is desired. The condenser 256 may be made variable and resistor 255 made fixed, or if desired, both the condenser 256 and resistor 255 may be made variable. The amplitude of the sine wave at the cathode and anode of the vacuum tube 254 are equal and 180° out of phase with respect to each other. These voltages are fed simultaneously to the network comprising resistor 255 and condenser 256 through which the phase shift action takes place.

Cathode follower circuit

The use of the cathode follower circuit in our device is very widespread. It is a known fact that a cathode follower circuit utilizes voltage feedback, thus allowing the grid to be driven very far positive before grid conduction occurs, but may be driven negative only as far as cutoff. If then the grid is biased positively a much larger signal may be accommodated without introducing distortion. Furthermore, it means that a very large negative going signal such as a pulse may be applied to the grid of a cathode follower, and a large, undistorted negative going signal obtained at the output. Figure 12 illustrates our cathode follower circuit in which the resistor 261 is of a very large value compared to resistor 262.

Phase discriminating circuit

This circuit comprises the two squaring stages 108, 110 and the D. C. restorer and filtering circuit 109 of Figure 5. Referring to Figure 13a, each squaring circuit 108 and 110 may consist of as many tubes as are necessary to produce square waves with substantially square sides. Bias voltages on these tubes are adjusted so that the width of the positive and negative portions of the square waves will be equal. The voltage wave forms from each squaring stage are thus made identical as possible with respect to width and amplitude. The outputs of the two squaring stages are added together and fed to a D. C. restorer. As the output of the D. C. restorer gives a peak voltage, the output of the filter will be nearly constant except when the two sine waves are out of phase. At this instant the two square waves produced cancel one another and the voltage output is zero. The block diagram for this arrangement is shown in Figure 13a, while Figure 13b is a graphical illustration of how the D. C. voltage drops to zero when the phase difference of the two input waves is 180°.

If desired however the waveform produced by adding the output of squaring stages 108 and 110 may be applied to a rectifier wherein the voltage output will be proportional to the area of the waveform. The voltage obtained thereby may be applied to a suitable indicating means calibrated to read phase difference directly.

Lobe pattern generator circuits

It has been previously stated that the purpose of the lobe pattern generator 29 is to obtain a plurality of wave forms that will represent the lobe patterns of a radio object locating system antenna or antennas. The circuits for accomplishing this end will now be reviewed. A glance at the block diagram of the lobe pattern generator illustrated in Figure 6 and the discussion of the theory shows the necessity for locking together the oscillators. Generally speaking this is accomplished by feeding a locking voltage into a conventional squaring circuit and thence through a short time-constant circuit, the output of which is a positive and negative going pulse. These pulses are then fed into the oscillator which is thereby locked to the frequency of the locking voltage. Instead of a positive and negative going pulse to be fed to the oscillator, a positive pulse would suffice. The pulse may be fed to any element of the oscillator tube as well as to either the suppressor grid or the control grid of the oscillator, although if fed to the suppressor grid less distortion will result. In our specific embodiment there exists a plurality of oscillators, the frequency of each being a multiple or sub-multiple of the frequency to which the oscillators are to be locked. The locking is accomplished by means of a sharp pulse in such a manner that the outputs of the oscillators have any desired phase relationship with respect to each other. Referring to Figure 14 in which is shown such a circuit diagram, the locking voltage is fed into a transformer 270 which is part of a phase shift circuit comprising condenser 271, and resistors 272 and 273. Circuit elements 274, 275 and 276 have a similar function but act substantially independently of elements 271, 272, and 273. The sine wave issuing from the phase shift network to the grid of tube 277 can be shifted in phase by means of variable resistance 273. Similarly, the sine wave issuing from the phase shift circuit to the grid of tube 278 can be shifted in phase by variable resistance 276. Tubes 277 and 278 are conventional squaring tubes, the output of each being a square wave that can be phase-shifted by 273 and 276 respectively. The square wave is then fed through a short time-constant circuit comprising condenser 279 and resistor 280, the output being a sharp negative and positive going pulse which is fed to the suppressor grid of tube 281 as a locking pulse. Tube 281 is in an oscillator circuit which may be of the resistance-condenser phase shift type. Tubes 278 and 283 perform the same function as tubes 277 and 282. 284 is an oscillator similar to that of 281 but having a different period of oscillation. Inasmuch as the input to tube 277 may be phase shifted independently of the input to tube 278 and vice versa, the locking pulse into the suppressor grids of vacuum tubes 281 and 284 respectively can be shifted independently. As the locking pulses striking the suppressor grids determine the starting phase of the oscillators, and the pulses lock the oscillators to the locking frequency, thus the oscillators may be so locked as to have any desirable phase relationship with each other. In the specific embodiment of our invention, six oscillators at different frequencies are tightly locked, with good waveform output in such a manner that at a certain instant all oscillator voltage outputs are a maximum, i. e., they are all locked as cosine waves. If desired, they may be locked as sine waves or in any other manner.

If desired, the locking pulse may be fed into the grid of a cathode ray tube thus producing a black-out and bright spot on the time base of the cathode ray tube. Using such a marker the oscillators may be easily synchronized. It should be noted that either cosine or sine terms may be obtained depending upon how the oscillators are synchronized. The oscillators may be of the resistance capacitance type, although other types of oscillators may be used.

The output of each oscillator is fed to a separate AVC circuit in order to maintain a constant amplitude of oscillations. The oscillator outputs are adjusted to equal amplitude and fed to six separate phase splitters, 124, 124a, etc. (Figure 6). The cathodes of these phase splitters provide positive cosine functions and the anodes provide negative cosine functions. By properly proportioning the cathode and anode loads these outputs may be obtained in different proportions. For example if the cathode circuit had two 10-thousand-ohm resistors connected in series to ground and the anode circuit had two 10-thousand-ohm resistors connected in series to B+ and the input to said tube was cos $A$ then: from the cathode circuit could be obtained two outputs proportional to cos $A$ and $$\frac{\cos A}{2}$$

and from the anode circuit could be obtained two outputs proportional to —cos $A$ and $$-\frac{\cos A}{2}$$

From these phase splitters 124, 124a etc., the signals are fed through isolation circuits, to be combined in accordance with the lobe pattern equations on the grids of twelve other phase splitters 125, 125a, etc. The constant term of the equation is not yet present but is added to the grids of the output tubes as a bias. The output tubes in this embodiment are used as class B amplifiers.

In our specific embodiment the lobe pattern equations are represented by certain waveforms and no distinguishment is made between negative and positive lobes, hence the output tubes "rectify" or so invert portions of the waveforms so that the waveforms obtained are similar to those in which lobe patterns are represented in Cartesian coordinates.

In the specific embodiment of our device it is often necessary to rectify a complex waveform about an imaginary axis parallel to the baseline of the waveform and some distance from it. This may be accomplished by feeding the waveform to the grid of a triode, whereby the voltage output of the cathode and anode circuits will be 180° out of phase and feeding each of the said outputs to the grid of a double triode tube which has a common anode load. Each half of the double triode tube has an independent negative bias on the grid such as to give class B operation. These grid biases determine the axis about which the waveform input will be rectified. Since the waveforms to the grids of the double triode are 180° out of phase, each half of the tube will conduct on alternate half cycles. The outputs of each half of the double triode are added through the common anode load. Voltage feedback may be used to preserve waveform and minimize difference in gain of each half of the double triode. The axis about which the complex waveform is rectified is directly dependent upon the bias of the double triode grids.

Hyperbolic function circuit

This circuit is one of the most important ones in our training device since it is the circuit that solves the equation $$\text{sine } \theta = \frac{\text{height}}{\text{range}}$$

that is solved in the height finding control chassis 31, 31a, and 31b. This equation must be solved electrically for any radar training device that must furnish complete data on simulated targets. The method and means of accomplishing this result will now be described in detail. From the elementary relationship true of any vacuum tube we know that $$\text{gain} = \frac{\text{output}}{\text{input}}$$

If now the input can be varied over a wide range and the output kept constant by means of an AVC circuit, then the gain equation may be rewritten as $$\text{gain} = \frac{\text{constant}}{\text{variable input}}$$

which equation is the general form of a rectangular hyperbola. In our specific embodiment the variable input is the 60-cycle range voltage. Our equation thus becomes $$\text{gain} = \frac{\text{constant}}{\text{range}}$$

which can be written $$\text{gain} = \frac{\text{height}}{\text{range}}$$

or gain is proportional to sine $\theta$.

The sixty cycle voltage of variable input is fed to the grid of a variable $\mu$ stage, the output of which is kept constant by means of an AVC circuit. From the equation $$\text{gain} = \frac{\text{constant}}{\text{variable input}}$$

it is seen that the gain of the variable $\mu$ stage is varying hyperbolically and it is now merely necessary to obtain a voltage that is proportional to the gain of this stage. This is done by introducing a "measuring stick" in the form of a constant amplitude voltage having a different frequency than the variable input voltage. A different frequency is chosen so that the variable input and the "measuring stick" voltage may be conveniently separated by suitable filters. In our specific embodiment we have chosen a frequency of 1200 cycles per second for the "measuring stick" voltage, although other frequencies are also suitable.

Referring to the block diagram of this circuit illustrated in Figure 15, the variable $\mu$ tube 300 has two inputs, the first being a voltage (60 cycle) of variable amplitude, the second a voltage (1200 cycle) of fixed amplitude. The output of the second variable $\mu$ tube 301 is branched to two filters 303 and 304 (1200 cycle and 60 cycle) respectively. The 60 cycle output of the filter 304 passes to an AVC diode 305, the output of which is filtered in 302 and applied to the variable μ tubes 300, 301 as bias. From the equation $$\text{gain or sine } \theta = \frac{\text{height}}{\text{range}}$$

and since height equals a constant, it is seen that the gain of the variable μ stage, with AVC, is varying inversely with the Range 60 cycle imput, or hyperbolically. The constant amplitude voltage of 1200 cycle is also fed through the variable μ stage 300, 301. The output of this stage has a filter tuned for 1200 cycles. The amplitude of the 1200 cycle voltage issuing from this filter varies directly as the gain of the variable μ stage. Thus it is seen that the amplitude of the 1200 cycle voltage varies inversely as the variable 60 cycle input. The varying 1200 cycle output of filter 303 may be converted to D. C. in the D. C. restorer and filter circuit 306. Although two variable μ stages are shown in our specific embodiment, as many as desired may be used with success. Although a variable μ stage gives the best results, AVC may be obtained by using other tubes and circuits known in the art.

Referring now to Fig. 16, which is a schematic circuit diagram of one embodiment of the hyperbolic circuit shown in block form in Fig. 15, wherein vacuum tubes 401 and 402 are the variable μ stages 300 and 301 of Fig. 15, transformer 403 is the filter circuit 303 of Fig. 15. Transformer 404 and capacitance 405 is filter 304 of Fig. 15, vacuum tube 406 is AVC diode 305 of Fig. 15, and resistance 407, capacitance 408, resistance 409, capacitance 410 represent filter circuit 302 of Fig. 15.

In the specific embodiment shown, the input voltages are at frequencies of 1200 cycles and 60 cycles, although it is to be understood that other frequencies may be used if desired.

The 60-cycle input will be variable whereas the 1200-cycle input will be fixed in amplitude. The 60-cycle input is applied at terminal 411. The 60-cycle input is attenuated to a suitable value that may be applied to control grid 412 of vacuum tube 401. Anode 413 of vacuum tube 401 may be connected through anode load resistance 414 to a suitable source of positive potential 415. The 60-cycle voltage developed across anode load resistance 414 is fed by means of capacitance 416 and grid leak resistance 417 to control grid 418 of vacuum tube 402. Anode 419 of vacuum tube 402 is connected through the primary winding of transformer 403 to the primary winding of transformer 404 through said primary to positive potential source 415. The secondary winding of transformer 404 is tuned to a frequency of 60 cycles by means of capacitance 405. The 60-cycle voltage appearing across the secondary of transformer 404 is applied to control grid 420 of vacuum tube 421.

Vacuum tube 421 is an amplifier for the 60-cycle voltage appearing at control grid 420. Anode 422 of vacuum tube 421 is connected through the primary winding of transformer 423 to a source of positive potential 415 and the secondary winding is tuned to a frequency of 60 cycles by means of capacitance 424.

The voltage developed across secondary winding of transformer 423 is applied to a D. C. restorer circuit comprising capacitance 425, vacuum tube 406 and resistance 426. Positive bias is applied to cathode 427 of vacuum tube 406 by means of resistances 428 and 429. This bias assures that vacuum tube 406 will not conduct until the voltage applied to anode 430 of said vacuum tube exceeds the positive voltage on cathode 427. The 60-cycle voltage developed across resistance 426 is filtered by means of resistance 407 and capacitance 408 and the resulting D. C. voltage applied to grid leak 417 of vacuum tube 402. This voltage is further filtered by the filter section consisting of resistance 409 and capacitance 410 and is applied to grid leak 431 of vacuum tube 401.

The portion of the circuit just described deals only with the AVC action of the 60-cycle voltage applied to terminal 411. It has been found that the voltage input at terminal 411 may vary over a wide range and still have the voltage appearing across secondary winding of transformer 423 remain substantially constant. The gain of vacuum tubes 401 and 402 thus varies hyperbolically with respect to the 60-cycle input. A 1200-cycle voltage of fixed amplitude, which is to be used as a means for "measuring" the gain of vacuum tubes 401 and 402, is applied to terminal 432. It is fed to control grid 412 of vacuum tube 401. Appearing at anode 413 of said vacuum tube are two voltage components, one due to the 60-cycle voltage previously discussed and a 1200-cycle component due to the input at terminal 432. As the 60-cycle action has just been described, the 1200-cycle voltage will be considered separately. The 1200-cycle voltage is then fed through capacitance 416 and grid leak resistance 417 to control grid 418 of vacuum tube 402. The 1200-cycle voltage will then appear at anode 419 of said vacuum tube and will be developed across secondary winding of transformer 403. As secondary winding of transformer 404 is tuned to 60 cycles, very little of the 1200 cycles appearing at anode 419 will appear across the secondary of transformer 404. Instead, most of it will appear across the secondary winding of transformer 403. Any 1200-cycle voltage that does appear across secondary winding of transformer 404 is further filtered out or rejected by the tuned secondary winding in transformer 423. It is apparent then that the voltage appearing across secondary winding of transformer 423 is almost a pure 60-cycle sine wave.

The 1200-cycle sine wave appearing across secondary winding of transformer 403 is then fed to control grids 433 and 434 respectively, of vacuum tube 435. Vacuum tube 435 is a conventional push pull amplifier the output of which is fed through a D. C. restorer circuit comprising capacitance 436, vacuum tube 437 and resistance 438. A filter circuit consisting of resistance 439 and capacitance 440 is provided in order to convert the 1200-cycle oscillations appearing at cathode of vacuum tube 437 to a substantially D. C. voltage.

The D. C. voltage appearing at terminal 441 will always be substantially inversely proportional to the magnitude of the 60-cycle voltage applied to input terminal 411.

*Slicer circuit*

It was mentioned previously that in solving the equations 6 and 7 simultaneously, it was necessary to obtain an ordinate of the lobe pattern (Fig. 10a) and in the specific case, said ordinate would be represented by a voltage proportional thereto. It will be recalled that the slicing pulse was to be employed in performing this operation.

The general principle of operation of the slicer circuit is to apply the lobe pattern shaped voltage to the anode of a vacuum tube, said vacuum tube being normally biased beyond cutoff. Upon application of the slicing pulse to the grid of said vacuum tube, anode current flows in an amount proportional to the anode voltage at the instant the vacuum tube becomes conducting. This anode current is utilized to charge a condenser, thereby providing a voltage output.

Referring now to Figure 17 which is the schematic circuit diagram of one embodiment of a slicer circuit, the vacuum tube 500 is utilized as a cathode follower. Control grid 501 is biased positively by means of the voltage divider circuit comprising resistance 502 and 503. This circuit permits control grid 501 to accommodate a relatively large amplitude negative going signal. Vacuum tube 504 is the slicing tube which, as mentioned above, is normally biased beyond cutoff.

A lobe pattern shaped voltage may be applied to control grid 501 at terminal 505. Appearing at cathode 506 is a lobe pattern voltage substantially the same as applied to terminal 505, said lobe pattern voltage being developed across cathode load resistance 507. This voltage is then fed through capacitance 508 to appear as a varying anode voltage for anode 509 of vacuum tube 504. Anode 509 is connected through anode load resistance 510 to a source of suitable positive potential 511, thereby providing a D. C. anode voltage for vacuum tube 504. Capacitance 508 will charge, prior to application of the slicing pulse, to a value determined by the D. C. anode voltage. Upon application of the slicing pulse to control grid 512 at terminal 513, vacuum tube 504 will conduct. As the internal impedance of vacuum tube 504 may be quite low, and the impedance "looking back into" the cathode circuit of vacuum tube 500 may be low, and as cathode 514 of vacuum tube 504 may be connected to ground, the charging time for capacitance 508 will be relatively short. When vacuum tube 504 conducts, the side of capacitance 508 connected to anode 509 charges negatively to a new value substantially equal to the value of the then instantaneous anode voltage of vacuum tube 504. The net voltage appearing at anode 509 of vacuum tube 504 will be the difference between the original voltage (voltage prior to tube conduction) appearing at said anode and the charge on capacitance 508, due to tube conduction.

The discharge circuit (including resistance 510) for capacitance 508 presents a long time constant for said discharge; the result being that capacitance 508 will lose only a small amount of its charge between slicing pulses. The resultant voltage appearing at anode 509 is then filtered by means of a circuit comprising resistance 515 and capacitance 516.

Appearing at an output terminal 517 is a D. C. voltage whose magnitude is proportional to the amplitude of the varying lobe pattern voltage applied to anode 509 at the instant the slicing pulse caused vacuum tube 504 to conduct. Resistance 518 in series with grid 512 assures that the slicing pulse at grid 512 will remain at substantially constant amplitude.

Thus it is seen that we have devised a radio object-locating system trainer which will accurately simulate the electrical effects appearing in the receiver portion of a radio object-locating system when an actual moving target or object is located by the system.

Further embodiments, modifications, and variations may be resorted to within the spirit of the invention as herein claimed.

We claim:

1. A device for simulating actual target effects in a radio object locating system, comprising a pulse recurrence frequency chassis for generating synchronizing pulses of electrical energy, a target position generator for producing voltage waves whose amplitudes are proportional to the range and whose phases are proportional to the azimuth of a plurality of simulated targets, a range and azimuth chassis for producing an azimuth voltage form and a range voltage form, an azimuth transmission panel coupled to said range and azimuth chassis for generating a voltage to simulate rotation of a radio object locating system antenna, a lobe pattern generator for producing a voltage form to simulate the lobe pattern of a radio object locating system antenna, a height finding control chassis to modify the outputs of the range and azimuth chassis, the pulse recurrence frequency chassis, and the lobe pattern generator whereby a plurality of pulses are obtained from said height finding control chassis, a switching panel and an output relay chassis.

2. In combination with the indicator of a radio object location system, a device for automatically simulating range and azimuth signals of an actual target, comprising means to produce a recurring pulse of electrical energy, means for automatically placing said pulse at a position on said indicator that is determined by the distance of the simulated target, means for generating two square wave voltages and D. C. restoring the sum of said square wave voltages whereby a D. C. voltage is secured whose amplitude varies with the phase difference of the said two square wave voltages, and means coupling said D. C. voltage to said indicator to place said recording pulse at an angular position proportional to said phase difference.

3. A device for simulating upon an indicator the electrical effects of target echo signals striking the receiving antenna of a radio object location system, comprising means for producing a recurring pulse and applying it to said indicator at a position that is determined by the distance of a simulated target, and electronic means for generating a voltage form corresponding to the lobe pattern equation of said antenna for varying the amplitude of said recurring pulse in accordance with said voltage form.

4. The device of claim 3, further including means for generating a voltage pulse at a time that varies hyperbolically with the distance of the simulated target, and means for applying said voltage pulse to said voltage form to establish which portion of said voltage form will determine the amplitude of said recording pulse.

5. A target position generator for providing a voltage whose phase represents azimuth and whose amplitude represents range of a moving object from a fixed point, where said moving object has a course-bearing other than said range and azimuth from said fixed point, including means for forming an initial voltage, said voltage being the resultant of two voltages of predetermined phase and magnitude and representing initial range and azimuth of said moving object at an initial point with respect to said fixed point, means for generating a second voltage, said voltage being the resultant of two voltages of predetermined phase and magnitude and representing the course-bearing of said moving object with respect to said initial point and whose magnitude continuously changes to represent changing range, means for combining said initial voltage and said second voltage to obtain a resultant voltage which represents the instantaneous range and azimuth of said moving object from said fixed point.

6. A device for simulating upon at least one indicator of a radio object locating system the effects of at least one moving target that might be detected by said system, comprising azimuth transmission means for generating a first sine wave which constantly varies in phase through 360° and simulates upon said indicator the effects produced by the rotation of at least one antenna in said system, target position means for generating a controllable second sine wave whose amplitude varies with the distance of a simulated target and whose phase varies with the azimuth of said simulated target, pulse recurrent frequency means for generating a first series of pulses for synchronizing said indicator, lobe pattern generation means for producing a lobe pattern voltage that varies with time in accordance with the repetitive lobe pattern of at least said one antenna of said system as it rotates through 360°, and pulse simulation means coupled to said indicator for deriving from said first series of pulses, from said first and second sine waves, and from said lobe pattern voltage, a second series of pulses each of which is displaced in time by an amount proportional to the distance of said simulated target and has an amplitude determined by said lobe pattern voltage for said simulated target, said pulse simulation means only permitting said second series of pulses to be applied to said indicator at the azimuth of said simulated target.

7. The device of claim 6, wherein said pulse simulation means includes means for deriving from said second sine wave a potential for varying the amplitudes of said second series of pulses by an amount inversely proportional to the distance of said simulated target.

8. The device of claim 7, further including means for adding voltages representing noise to said second series of pulses of said pulse simulation means.

9. The device of claim 6, wherein said pulse simulation means includes means receptive of said second sine wave and coupled to the output of said lobe pattern generation means for producing a series of slicing pulses each of which is displaced in time by an amount which varies hyperbolically with the distance of said simulated target, said slicing pulses defining the portion of the lobe pattern voltage permitted to determine the amplitude of said second series of pulses.

10. A device for simulaing upon at least one indicator of a radio object locating system the effects of at least one moving target that might be detected by said system, comprising azimuth transmission means for generating a first sine wave which constantly varies in phase through 360° and simulates upon said indicator the effects produced by the rotation of at least one antenna in said system, target position means for generating a controllable second sine wave whose amplitude varies with the distance of a simulated target and whose phase varies with the azimuth of said simulated target, pulse recurrent frequency means for generating a first series of pulses for synchronizing said indicator, range and azimuth means receptive of said first series of pulses for deriving from said first and second sine waves a D.-C. azimuth potential whose magnitude is proportional to the azimuth of said target, and for deriving from said second sine wave and said first series of pulses, a second series of pulses, each of which is displaced in time by an amount proportional to the distance of said simulated target, lobe pattern generation means for producing a lobe pattern voltage that varies with time in accordance with the repetitive lobe pattern of at least said one antenna of said system as it rotates through 360°, and pulse simulation means coupled to said indicator for deriving from said second series of pulses, from said second sine wave, and from said lobe pattern voltage, a third series of pulses each of which is displaced in time by an amount proportional to the distance of said simulated target and has an amplitude determined by said lobe pattern voltage for said simulated target, said D.-C. azimuth potential only permitting said third series of pulses to be applied to said indicator at the azimuth of said simulated target.

11. The device of claim 10, wherein said range and azimuth means includes means coupled to said pulse simulation means for deriving from said second sine wave a D.-C. range potential for varying the amplitudes of said third series of pulses by an amount inversely proportional to the distance of said simulated target.

12. The device of claim 11, further including means for adding voltages representing noise to said third series of pulses of said pulse simulation means.

13. The device of claim 10, wherein said pulse simulation means includes means receptive of said second sine wave and coupled to the output of said lobe pattern generation means for producing a series of slicing pulses each of which is displaced in time by an amount which varies hyperbolically with the distance of said simulated target, said slicing pulses defining the portion of the lobe pattern voltage permitted to determine the amplitudes of said third series of pulses.

14. A device for simulating upon at least one indicator of a radio object locating system the effects of at least one moving target that might be detected by said system, comprising lobe pattern generation means for producing at least two lobe pattern voltages that respectively vary with time in accordance with the repetitive height finding phase and antiphase lobe patterns of at least two antennas of said system, which antennas are disposed at different heights, as they rotate through 360°, azimuth transmission means for generating a first sine wave which constantly varies in phase through 360° and simulates upon said indicator the effects produced by the rotation of said antennas in said system, target position means for generating a controllable second sine wave whose amplitude varies with the distance of a simulated target and whose phase varies with the azimuth of said simulated target, pulse recurrent frequency means for generating a first series of pulses for synchronizing said indicator, pulse simulation means coupled to said indicator and receptive of said first series of pulses, said first and second sine waves, and said two lobe pattern voltages for deriving a second and third series of pulses each of which pulses is displaced in time by an amount proportional to the distance of said simulated target, said second and third series of pulses respectively having amplitudes determined by said two lobe pattern voltages for said simulated target, and switching means coupled to said pulse simulation means for generating two square waves 180° out of phase with one another for alternately passing said second and third series of pulses on to said indicator, said pulse simulation means only permitting said second and third series of pulses to be applied to said indicator at the azimuth of said simulated target.

15. A device for simulating upon at least one indicator of a radio object locating system the effects of at least one moving target that might be detected by said system, comprising lobe pattern generation means for producing at least two lobe pattern voltages that respectively vary with time in accordance with the repetitive lobe patterns of at least two antennas of said system as they rotate through 360°, azimuth transmission means for generating a first sine wave which constantly varies in phase through 360° and simulates upon said indicator the effects produced by the rotation of said antennas in said system, target position means for generating a controllable second sine wave whose amplitude varies with the distance of a simulated target and whose phase varies with the azimuth of said simulated target, pulse recurrent frequency means for generating a first series of pulses for synchronizing said indicator, pulse simulation means, receptive of said first series of pulses, said first and second sine waves, and said two lobe pattern voltages, for deriving a second and third series of pulses each of which pulses is displaced in time by an amount proportional to the distance of said simulated target, said second and third series of pulses respectively having amplitudes determined by said two lobe pattern voltages for said simulated target, and selector means coupling said pulse simulation means to said indicator for selectively applying either said second or said third series of pulses to said indicator, said pulse simulation means only permitting pulses to be applied to said indicator at the azimuth of said simulated target.

16. The device of claim 15, wherein said two antennas are disposed at different heights and one of said two lobe pattern voltages generated by said lobe pattern generation means comprises the lobe pattern of said two antennas operating in normal phase, the other of said two lobe pattern voltages comprising the lobe pattern of said two antennas operating in normal antiphase.

17. The device of claim 16, wherein said lobe pattern generation means produces at least four additional lobe pattern voltages respectively representing the repetitive height finding phase and height finding antiphase lobe patterns of each of said two antennas disposed at different heights, said pulse simulation means producing four additional series of pulses displaced in time like said second and third series of pulses and respectively having their amplitudes determined in accordance with said four additional lobe pattern voltages for said simulated target, the two series of pulses corresponding to the height finding phase lobe patterns for each of said two antennas being coupled together and the two series of pulses corresponding to the height finding antiphase lobe patterns for each of said two antennas being coupled together, and switching means coupled to said pulse simulation means for generating two square waves 180° out of phase with one another for alternately blocking and passing the two series of pulses corresponding to the height finding phase lobe patterns of both antennas while alternately passing and blocking the two series of pulses corresponding to the height finding antiphase lobe patterns of both antennas, said selector means selectively applying to said indicator either said second series of pulses, or said third series of pulses, or the two series of alternated pulses corresponding to said height finding phase lobe patterns, or the two series of alternated pulses corresponding to the height finding antiphase lobe patterns.

18. The device of claim 17, wherein said pulse simulation means includes means for deriving from said second sine wave a D.-C. range potential for varying the amplitudes of the pulses applied to said indicator by an amount inversely proportional to the distance of said simulated target.

19. The device of claim 18, wherein said pulse simulation means includes means for deriving from said first and second sine waves a D.-C. azimuth potential whose magnitude is proportional to the azimuth of said simulated target, said azimuth potential only permitting pulses to be applied to said indicator by said pulse simulation means at the azimuth of said simulated target.

20. The device of claim 19, wherein said pulse simulation means includes means for deriving from said first series of pulses and said second sine wave a series of pulses each of which is displaced in time in accordance with the distance of said simulated target and from which the pulses applied to said indicator are derived.

21. The device of claim 20, wherein said pulse simulation means includes slicer means receptive of said second sine wave and coupled to the output of said lobe pattern generation means for producing a series of slicing pulses each of which is displaced in time by an amount which varies hyperbolically with the distance of said simulated target, said slicing pulses defining the portion of each lobe pattern voltage permitted to determine the amplitude of its corresponding series of pulses.

22. The device of claim 21, wherein said slicer means comprises means receptive of said second sine wave and a third sine wave for causing said third sine wave to vary hyperbolically with said second since wave to produce a hyperbolic D.-C. potential whose magnitude varies hyperbolically with the distance of said simulated target, and means receptive of said hyperbolic D.-C. potential and of a series of triangular pulses having a frequency that is an integral multiple of the repetition frequency of said lobe pattern voltages for producing a slicing pulse for each of said triangular pulses at a time varying in accordance with said hyperbolic D.-C. potential.

23. The device of claim 22, further including means for adding voltages representing noise to the pulses applied to said indicator.

References Cited in the file of this patent

UNITED STATES PATENTS

| Number | Name | Date |
|---|---|---|
| 2,132,654 | Smith | Oct. 11, 1938 |
| 2,164,412 | Koster | July 4, 1939 |
| 2,203,004 | West | June 4, 1940 |

(Other references on following page)

UNITED STATES PATENTS

| Number | Name | Date |
|---|---|---|
| 2,231,955 | Schrader | Feb. 18, 1941 |
| 2,252,083 | Luck | Aug. 12, 1941 |
| 2,254,159 | Sperti | Aug. 26, 1941 |
| 2,266,509 | Percival | Dec. 16, 1941 |
| 2,269,001 | Bliemlein | Jan. 6, 1942 |
| 2,309,525 | Mohr | Jan. 26, 1943 |
| 2,312,962 | De Florez | Mar. 2, 1943 |
| 2,326,764 | Crane | Aug. 17, 1943 |
| 2,341,232 | Norton | Feb. 8, 1944 |
| 2,352,216 | Melvin | June 27, 1944 |
| 2,353,672 | Keck | July 18, 1944 |
| 2,359,294 | Blenman | Oct. 3, 1944 |
| 2,370,692 | Shepherd | Mar. 6, 1945 |
| 2,396,857 | Kittredge | Mar. 19, 1946 |
| 2,399,661 | Bowie | May 7, 1946 |
| 2,405,591 | Mason | Aug. 13, 1946 |
| 2,438,888 | Andrews | Apr. 6, 1948 |
| 2,438,940 | Pennoyer | Apr. 6, 1948 |
| 2,442,351 | Fritschi | June 1, 1948 |
| 2,453,743 | Cesareo | Nov. 16, 1948 |
| 2,468,097 | Moore | Apr. 26, 1949 |
| 2,472,706 | Hulst | June 7, 1949 |

OTHER REFERENCES

Hess, Abstract Ser. No. 516,942, published Aug. 16, 1949.